United States Patent
Nakagawa et al.

(10) Patent No.: US 12,359,276 B2
(45) Date of Patent: Jul. 15, 2025

(54) METHOD FOR MANUFACTURING STEEL SHEET FOR COLD PRESS AND METHOD FOR MANUFACTURING PRESS COMPONENT

(71) Applicant: JFE STEEL CORPORATION, Tokyo (JP)

(72) Inventors: Kinya Nakagawa, Tokyo (JP); Yuichi Matsuki, Tokyo (JP); Toyohisa Shinmiya, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 853 days.

(21) Appl. No.: 17/433,921

(22) PCT Filed: Feb. 25, 2020

(86) PCT No.: PCT/JP2020/007513
§ 371 (c)(1),
(2) Date: Aug. 25, 2021

(87) PCT Pub. No.: WO2020/175486
PCT Pub. Date: Sep. 3, 2020

(65) Prior Publication Data
US 2022/0049324 A1    Feb. 17, 2022

(30) Foreign Application Priority Data

| Feb. 27, 2019 | (JP) | 2019-034755 |
| Feb. 27, 2019 | (JP) | 2019-034756 |
| Feb. 27, 2019 | (JP) | 2019-034757 |
| Jun. 26, 2019 | (JP) | 2019-118512 |
| Jun. 26, 2019 | (JP) | 2019-118513 |
| Jun. 26, 2019 | (JP) | 2019-118514 |

(51) Int. Cl.
*C21D 9/48* (2006.01)
*C21D 1/18* (2006.01)
*C21D 1/42* (2006.01)

(52) U.S. Cl.
CPC ............... *C21D 9/48* (2013.01); *C21D 1/18* (2013.01); *C21D 1/42* (2013.01); *C21D 2211/001* (2013.01); *C21D 2211/002* (2013.01); *C21D 2211/005* (2013.01); *C21D 2211/008* (2013.01); *C21D 2221/02* (2013.01)

(58) Field of Classification Search
CPC .................................................... C21D 9/48
See application file for complete search history.

(56) References Cited

U.S. PATENT DOCUMENTS

| 10,670,515 B2 | 6/2020 | Oetjens et al. |
| 2013/0133786 A1 | 5/2013 | Matsuda et al. |
| 2016/0169791 A1 | 6/2016 | Oetjens et al. |
| 2017/0333971 A1 | 11/2017 | Denks et al. |
| 2020/0038933 A1 | 2/2020 | Mutze et al. |
| 2020/0078853 A1 | 3/2020 | Denks et al. |
| 2020/0346269 A1 | 11/2020 | Tobita et al. |

FOREIGN PATENT DOCUMENTS

| CN | 102884209 A | 1/2013 | |
| DE | 10 2016 121 902 A1 | 5/2018 | |
| DE | 10 2017 103 729 A1 | 8/2018 | |
| JP | H09-143554 A | 6/1997 | |
| JP | 2001-323318 A | 11/2001 | |
| JP | 2002-113527 A | 4/2002 | |
| JP | 2009-61477 A | 3/2009 | |
| JP | 5902939 B2 | 4/2016 | |
| JP | 2019-073763 A | 5/2019 | |
| JP | 2019-111567 A | 7/2019 | |
| WO | 2013/089167 A1 | 6/2013 | |
| WO | 2014/189777 A2 | 11/2014 | |
| WO | WO-2018153615 A1 * | 8/2018 | ............. B21D 19/08 |
| WO | 2019/131289 A1 | 7/2019 | |

OTHER PUBLICATIONS

Oct. 28, 2022 Office Action issued in Chinese Patent Application No. 202080016401.X.
Aug. 25, 2021 International Preliminary Report on Patentability issued in International Patent Application No. PCT/JP2020/007513.
Apr. 8, 2022, extended Search Report issued in European Patent Application No. 20763410.6.
May 19, 2020 International Search Report issued in International Patent Application No. PCT/JP2020/007513.
Dec. 3, 2024 Extended Search Report issued in European Patent Applicant No. 20763410.6.
Dec. 3, 2024 Office Action issued in European Patent Application No. 20763410.6.

\* cited by examiner

*Primary Examiner* — Jophy S. Koshy
(74) *Attorney, Agent, or Firm* — Oliff PLC

(57) ABSTRACT

A method that improves stretch flange formability of a steel sheet by individual treatment matching a material of the steel sheet without performing heat treatment in a die. This method is a method for manufacturing a steel sheet for cold press, and the steel sheet is manufactured by heating an edge of the steel sheet to a temperature within a heating temperature range preset according to a microstructure of the steel sheet and cooling the steel sheet. A region, within an edge of the steel sheet subjected to shearing in a shearing step, where it is estimated that a stretch flange crack is likely to occur when a press component is formed by cold pressing is determined, and a site to be heated and cooled is set within the region. By press-forming the manufactured steel sheet, a target press component is manufactured.

3 Claims, 13 Drawing Sheets

DIRECTION OF MOVEMENT

RSK

40

40
40a

40
X
40a

11

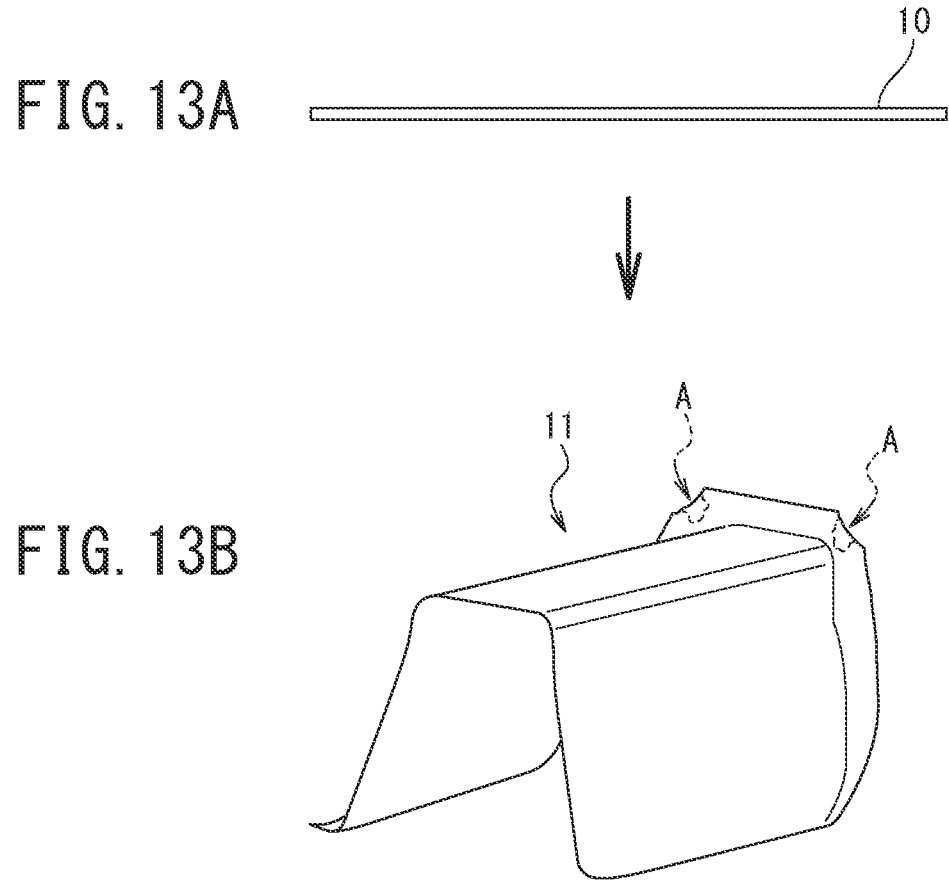
FIG. 13A
FIG. 13B
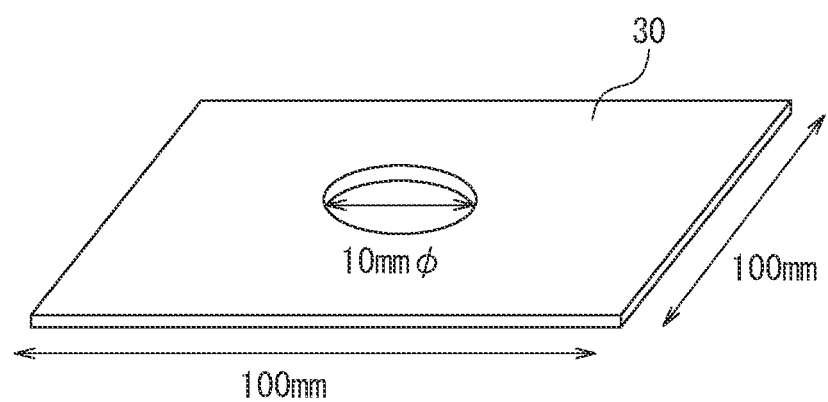
FIG. 14

METHOD FOR MANUFACTURING STEEL SHEET FOR COLD PRESS AND METHOD FOR MANUFACTURING PRESS COMPONENT

TECHNICAL FIELD

The present invention relates to a method for manufacturing a steel sheet for cold press and a method for manufacturing a press component. The present invention particularly relates to a technology suitable for a press component made of a high-strength steel sheet.

BACKGROUND ART

At the present time, improvement in fuel consumption through weight reduction and improvement in collision safety are required for vehicles, and, aimed at achieving both weight reduction of a vehicle body and passenger protection at the time of collision at the same time, high-strength steel sheets are used for vehicle bodies. Recent years, in particular, ultrahigh-strength steel sheets having a tensile strength of 980 MPa or more have been applied to structural members of vehicle bodies. Problems to be solved in press forming of an ultrahigh-strength steel sheet includes a stretch flange crack. A stretch flange crack is largely related to a worked state of an edge face, and, as the amount of work-hardening of an edge face becomes smaller, stretch flange formability generally improves. By forming a blank material into a target shape and subsequently mechanically grinding an edge face thereof, it is possible to hold the amount of work-hardening of the edge face to minimum. However, mass productivity of mechanical grinding is substantially low. Hence, from a viewpoint of mass productivity, shearing is generally employed when a blank material is formed into a target shape.

On this occasion, a large amount of strain is introduced into a sheared edge face because of shearing, and the amount of work-hardening becomes substantially large, which causes toughness to be reduced.

For example, since, with regard to a high-strength steel sheet composed of a single phase of martensite, the microstructure is substantially hard, the amount of introduced work-hardening is large, and tendency of toughness reduction becomes prominent, stretch flange formability of a steel sheet after shearing becomes substantially low.

It is known that, among high-strength steel sheets, a high-strength steel sheet composed of a composite microstructure mainly including martensite and ferrite enables an excellent balance between strength and stretchability to be achieved by making a hard martensite phase cope with strength and a soft ferrite phase cope with stretchability. However, when press forming including stretch flange forming is performed, a difference in hardness between the martensite phase and the ferrite phase is large. Thus, when a steel sheet composed of the composite microstructure is used, strain concentrates on and a crack occurs at an interface between the martensite phase and the ferrite phase, which causes stretch flange formability to be lowered. Further, since, when an edge face is sheared, the edge face is work-hardened and toughness is reduced, stretch flange formability of the steel sheet after shearing becomes substantially low.

In a high-strength steel sheet composed of a composite microstructure including residual austenite, a residual austenite phase deforms during forming and subsequently transforms into a hard martensite phase, which causes strain at the time of deformation to be dispersed and a substantially high stretchability to be provided. However, the high-strength steel sheet composed of a composite microstructure including residual austenite has a tendency that there occurs stress concentration on a grain boundary caused by volume change at the time of transformation from the austenitic phase to the martensite phase and strain concentration on a grain boundary caused by increase in a hardness difference from a surrounding microstructure that occurs because hardness increases due to transformation into the martensite phase. There is a problem in that, due to this tendency, the high-strength steel sheet composed of a composite microstructure including residual austenite has a low stretch flange formability. In particular, since, when a stretch flange crack risk site is a sheared face, austenite transforms into martensite at the time of shearing, workability of the sheared edge face is reduced and stretch flange formability further deteriorates.

Examples of a technology for improving workability of a high-strength steel sheet includes a hot stamping technology as described in PTL 1. This technology is a technology in which a steel sheet is heated to a predetermined temperature and is thereby softened, the steel sheet is subsequently put in a die while being kept at the temperature, and forming and quenching are performed at the same time. In the technology, no crack occurs because the steel sheet is soft at the time of working, and a quenched hard product can be acquired after working.

In PTL 2, a technology for, by partially heating a steel sheet to a recrystallization temperature or more (800° C. or more), softening the steel sheet locally and improving formability is disclosed.

CITATION LIST

Patent Literature

PTL 1: JP 5902939 B
PTL 2: JPH9-143554 A

SUMMARY OF INVENTION

Technical Problem

However, in the technology described in PTL 1, it is required to heat a steel sheet to a predetermined temperature and put the steel sheet into a die at the temperature. Thus, in the technology in PTL 1, it is required to place, in a manufacturing line, a furnace or some heating apparatus equivalent thereto and, further, an apparatus for moving a high-temperature steel sheet from the furnace to the inside of the die, and it therefore takes a lot of cost. In addition, in the technology in PTL 1, in addition to the fact that it takes a time to heat a steel sheet, since it is required to perform quenching inside a die, it takes a time to hold the steel sheet inside the die. Further, in the technology in PTL 1, since it is required to secure a time to cool the die after forming, temporal cost is also high.

In addition, with regard to the technology described in PTL 2, there is a problem in that, since brittleness is reduced because of recrystallization, effectiveness of the technology is low for a stretch flange crack.

As described above, conventionally, improvement in stretch flange formability of high-strength steel sheets has become a problem to be solved.

The present invention has been made to solve the above-described problem, and an object of the present invention is to improve stretch flange formability of a steel sheet without performing material heating inside a die.

Solution to Problem

The inventors have discovered that, at the time of heating and cooling an edge of a steel sheet, appropriately setting a heating temperature range individually according to a material of the steel sheet enables stretch flange formability to be improved. In other words, the inventors have acquired knowledge that individually subjecting a steel sheet to heat treatment matching a microstructural composition of the steel sheet enables stretch flange formability of a press component to be improved.

In other words, to solve the problem, one aspect of the present invention is a method for manufacturing a steel sheet for cold press subjected to cold pressing and includes a shearing step of subjecting at least a portion of an edge of the steel sheet to shearing, an analysis step of determining, within the edge of the steel sheet subjected to shearing in the shearing step, a region where it is estimated that a stretch flange crack is likely to occur when the steel sheet is formed by cold pressing, and a heating and cooling step of heating, within the edge of the steel sheet, a site included in the region determined in the analysis step to a temperature within a heating temperature range preset according to a microstructural composition of the steel sheet and cooling the site, in which, when, as the steel sheet, a steel sheet the principal microstructure of which is composed of a single phase of martensite is used, the method sets the heating temperature range to a heating temperature range of 500° C. or more and 700° C. or less, when, as the steel sheet, one of a steel sheet the principal microstructure of which is composed of a composite microstructure of martensite and ferrite, a steel sheet the principal microstructure of which is composed of a single phase of bainite, a steel sheet the principal microstructure of which is composed of a single phase of ferrite, and a steel sheet the principal microstructure of which is composed of a composite microstructure of ferrite and pearlite is used, the method sets the heating temperature range to a heating temperature range of 400° C. or more and 700° C. or less, and, when, as the steel sheet, a steel sheet composed of a composite microstructure including residual austenite is used, the method sets the heating temperature range to a heating temperature range of 200° C. or more and 700° C. or less.

Another aspect of the present invention is a method for manufacturing a press component for manufacturing a press component having a target press component shape by subjecting a steel sheet to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a heating temperature range preset according to a microstructural composition of the steel sheet and cooling the site, in which, when, as the steel sheet, a steel sheet the principal microstructure of which is composed of a single phase of martensite is used, the method sets the heating temperature range to a heating temperature range of 500° C. or more and 700° C. or less, when, as the steel sheet, one of a steel sheet the principal microstructure of which is composed of a composite microstructure of martensite and ferrite, a steel sheet the principal microstructure of which is composed of a single phase of bainite, a steel sheet the principal microstructure of which is composed of a single phase of ferrite, and a steel sheet the principal microstructure of which is composed of a composite microstructure of ferrite and pearlite is used, the method sets the heating temperature range to a heating temperature range of 400° C. or more and 700° C. or less, and, when, as the steel sheet, a steel sheet composed of a composite microstructure including residual austenite is used, the method sets the heating temperature range to a heating temperature range of 200° C. or more and 700° C. or less.

Still another aspect of the present invention is a method for manufacturing a press component for manufacturing a press component having a target press component shape by subjecting a steel sheet to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region determined in the analysis step to a temperature within a heating temperature range preset according to a microstructural composition of the steel sheet and cooling the site, in which, when, as the steel sheet, a steel sheet the principal microstructure of which is composed of a single phase of martensite is used, the method sets the heating temperature range to a heating temperature range of 500° C. or more and 700° C. or less, when, as the steel sheet, one of a steel sheet the principal microstructure of which is composed of a composite microstructure of martensite and ferrite, a steel sheet the principal microstructure of which is composed of a single phase of bainite, a steel sheet the principal microstructure of which is composed of a single phase of ferrite, and a steel sheet the principal microstructure of which is composed of a composite microstructure of ferrite and pearlite is used, the method sets the heating temperature range to a heating temperature range of 400° C. or more and 700° C. or less, and, when, as the steel sheet, a steel sheet composed of a composite microstructure including residual austenite is used, the method sets the heating temperature range to a heating temperature range of 200° C. or more and 700° C. or less.

Still another aspect of the present invention is a method for manufacturing a steel sheet for cold press subjected to cold pressing, uses, as the steel sheet, a steel sheet the principal microstructure of which is composed of a single phase of martensite, and includes a shearing step of subjecting at least a portion of an edge of the steel sheet to shearing, an analysis step of determining, within the edge of the steel sheet subjected to shearing in the shearing step, a region where it is estimated that a stretch flange crack is likely to occur when the steel sheet is formed by cold pressing, and a heating and cooling step of heating, within the edge of the steel sheet, a site included in the region determined in the analysis step to a temperature within a temperature range of 500° C. or more and 700° C. or less and cooling the site.

Still another aspect of the present invention is a method for manufacturing a press component for manufacturing a press component having a target press component shape by subjecting a steel sheet the principal microstructure of which is composed of a single phase of martensite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 500° C. or more and 700° C. or less and cooling the site.

Still another aspect of the present invention is a method for manufacturing a press component for manufacturing a press component having a target press component shape by subjecting a steel sheet the principal microstructure of which is composed of a single phase of martensite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region determined in the analysis step to a temperature within a temperature range of 500° C. or more and 700° C. or less and cooling the site.

Still another aspect of the present invention is a method for manufacturing a steel sheet for cold press subjected to cold pressing, uses, as the steel sheet, a steel sheet the principal microstructure of which is composed of a composite microstructure of martensite and ferrite, and includes a shearing step of subjecting at least a portion of an edge of the steel sheet to shearing, an analysis step of determining, within the edge of the steel sheet subjected to shearing in the shearing step, a region where it is estimated that a stretch flange crack is likely to occur when the steel sheet is formed by cold pressing, and a heating and cooling step of heating, within the edge of the steel sheet, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a composite microstructure of martensite and ferrite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a composite microstructure of martensite and ferrite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region calculated in the analysis step to a temperature within a temperature range of 400° C. or more and 700° C. or less and cooling the site.

Still another aspect of the present invention is a method for manufacturing a steel sheet for cold press subjected to cold pressing, uses, as the steel sheet, a steel sheet composed of a composite microstructure including residual austenite, and includes a shearing step of subjecting at least a portion of an edge of the steel sheet to shearing, an analysis step of determining, within the edge of the steel sheet subjected to shearing in the shearing step, a region where it is estimated that a stretch flange crack is likely to occur when the steel sheet is formed by cold pressing, and a heating and cooling step of heating, within the edge of the steel sheet, a site included in the region determined in the analysis step to a temperature within a temperature range of 200° C. or more and 700° C. or less and cooling the site.

Still another aspect of the present invention is a method for manufacturing a press component for manufacturing a press component having a target press component shape by subjecting a steel sheet composed of a composite microstructure including residual austenite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 200° C. or more and 700° C. or less and cooling the site.

Still another aspect of the present invention is a method for manufacturing a press component for manufacturing a press component having a target press component shape by subjecting a steel sheet composed of a composite microstructure including residual austenite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region determined in the analysis step to a temperature within a temperature range of 200° C. or more and 700° C. or less and cooling the site.

Still another aspect of the present invention is a method for manufacturing a press component for manufacturing a press component having a target press component shape by subjecting a steel sheet the principal microstructure of which is composed of a single phase of bainite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a single phase of bainite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region calculated in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a single phase of ferrite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a single phase of ferrite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a composite microstructure of ferrite and pearlite to cold pressing, includes, as the cold pressing, a first step of press-forming the steel sheet into an intermediate component and a second step of press-forming the intermediate component into a target press component shape, and further includes a shearing step of, before the first step, subjecting at least a portion of an edge of the steel sheet to shearing, an analysis step of determining, within an edge of the intermediate component, a region where it is estimated that a stretch flange crack is likely to occur when the intermediate component is press-formed into a target press component shape in the second step, and a heating and cooling step of, before the second step, heating, within an edge of an intermediate component formed in the first step, a site included in the region determined in the analysis step to a temperature within a temperature range of 400° C. or more and 700° C. or less and cooling the site.

Still another aspect of the present invention is a method for manufacturing a press component for manufacturing a press component having a target press component shape by subjecting a steel sheet the principal microstructure of which is composed of a composite microstructure of ferrite and pearlite to cold pressing, includes, as the cold pressing, a first step of press-forming the steel sheet into an intermediate component and a second step of press-forming the intermediate component into a target press component shape, and further includes a shearing step of, before the second step, subjecting at least a portion of an edge of the intermediate component to shearing, an analysis step of determining, within an edge of the intermediate component after having been subjected to the shearing, a region where it is estimated that a stretch flange crack is likely to occur when the intermediate component is press-formed into a target press component shape in the second step, and a heating and cooling step of, before the second step, heating, within an edge of the intermediate component having been subjected to the shearing, a site included in the region determined in the analysis step to a temperature within a temperature range of 400° C. or more and 700° C. or less and cooling the site.

Advantageous Effects of Invention

According to the aspects of the present invention, by individually subjecting a steel sheet to heat treatment matching a material (microstructural composition) of the steel sheet, it is possible to improve stretch flange formability of the steel sheet. As a result, according to the aspects of the present invention, it becomes possible to suppress a stretch flange crack even when various types of components, such as a panel component and a structural and skeletal component, of vehicles are formed by cold working including one or two or more stages of press forming, using, for example, a high-strength steel sheet the principal microstructure of which is composed of a single phase of martensite, a high-strength steel sheet the principal microstructure of which is composed of a composite microstructure of martensite and ferrite, a high-strength steel sheet composed of a composite microstructure including residual austenite, a high-strength steel sheet the principal microstructure of which is composed of a single phase of bainite, a high-strength steel sheet the principal microstructure of which is composed of a single phase of ferrite (precipitation-strengthened steel), or a high-strength steel sheet the principal microstructure of which is composed of a composite microstructure of ferrite and pearlite.

BRIEF DESCRIPTION OF DRAWINGS

FIG. 13 is diagrams descriptive of an example of a region where a stretch flange crack occurs, and FIGS. 13A and 13B illustrate a steel sheet (blank material) and a press component after press forming, respectively;

FIG. 14 is a diagram illustrative of a specimen;

DESCRIPTION OF EMBODIMENTS

Embodiments of the present invention will now be described with reference to the drawings.

1. First Embodiment

Figure 1:
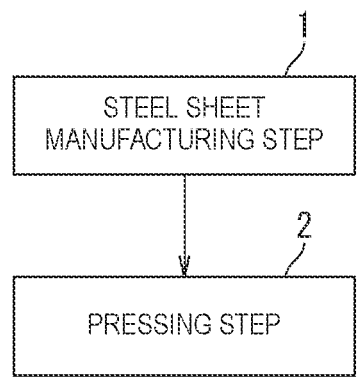
FIG. 1 is a diagram illustrative of a manufacturing step of a press component according to a first embodiment based on the present invention.
Figure 2:
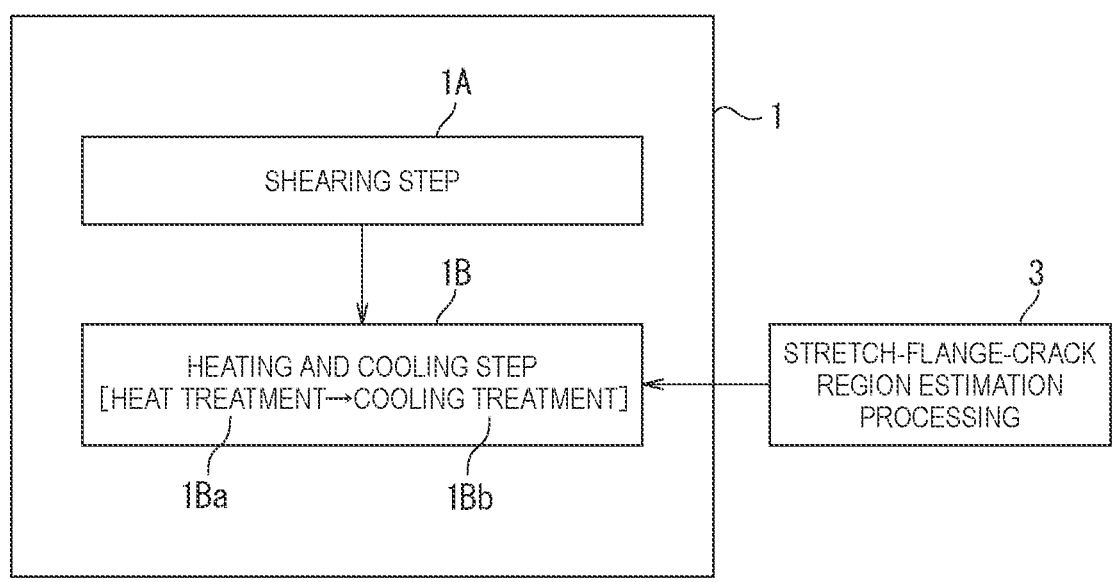
FIG. 2 is a diagram descriptive of a heating and cooling step according to the first embodiment based on the present invention.

First, a first embodiment will be described.
A method for manufacturing a press component in the present embodiment includes a steel sheet manufacturing step 1 and a pressing step 2, as illustrated in FIG. 1. In the steel sheet manufacturing step 1, a shearing step 1A and a heating and cooling step 1B are performed in this order, as illustrated in FIG. 2.

The method for manufacturing a press component in the present embodiment includes a stretch-flange-crack region estimation processing 3 that constitutes an analysis step.

The present embodiment is particularly effective in the case of a steel sheet the tensile strength of which is 440 MPa or more, and more particularly in the case of a steel sheet made of a high-strength steel sheet the tensile strength of which is 980 MPa or more. However, the present embodiment is applicable even to a steel sheet the tensile strength of which is less than 440 MPa.

<Shearing Step 1A>

The shearing step 1A is a step of acquiring a single steel sheet (blank material) having a target shape by trimming a steel sheet made of a piece of sheet material formed by rolling or the like into a preset blank material shape or forming an opening portion in the steel sheet by shearing, such as burring.

In the present embodiment, "single steel sheet" means that the steel sheet is, instead of a combined blank material into which a plurality of sheets are joined by welding, a steel sheet made of an identical metallic material.

Since, when a steel sheet is cut by shearing, damage to an edge face is larger than damage to an edge face produced by machining and the edge face is formed into a non-uniform edge face, stretch flange formability deteriorates.

A part to be sheared may be only a portion of the steel sheet. Note that the method for manufacturing a press component may include another shear treatment in which shaping of an edge face is performed, after the pressing step 2 or during the pressing step 2.

<Stretch-Flange-Crack Region Estimation Processing 3>

The stretch-flange-crack region estimation processing 3 is processing of specifying a position of a stretch flange crack region (also referred to as an analysis region) that is a region where it is estimated that a stretch flange crack is likely to occur when a single steel sheet having been subjected to the shear treatment in the shearing step 1A is subjected to press forming in the pressing step 2. A condition for a steel sheet for which an analysis region is to be determined requires that the steel sheet be a steel sheet that has not been subjected to treatment in the heating and cooling step 1B.

Such a stretch flange crack region (stretch flange crack risk site) may be specified through examination by CAE analysis using a computer, based on conditions for press forming in the pressing step 2 or may be specified by actual pressing. Generally, a curved portion in plan view, a burring portion, or the like is a stretch flange crack region. Thus, in a region in which stretch flange forming is performed, a flange portion that is formed into a shape having a predetermined radius of curvature or more by pressing may be simply specified as a stretch flange crack region (analysis region).

<Heating and Cooling Step 1B>

The heating and cooling step 1B is pre-treatment performed on a single steel sheet after the shearing step 1A before the single steel sheet is subjected to pressing including stretch flange forming. In the heating and cooling step 1B, a heat treatment 1Ba and a cooling treatment 1Bb are performed in this order.

(Heat Treatment 1Ba)

In the heat treatment 1Ba, treatment of heating an edge of a steel sheet is performed. As for a portion to be heated, a steel sheet edge is heated by heating at least an edge face of the steel sheet within the edge face of the steel sheet and a vicinity thereof. In the heat treatment 1Ba, the entire circumference of the steel sheet edge does not have to be heated, and it is only required to heat at least a steel sheet edge included in a stretch flange crack region specified by the stretch-flange-crack region estimation processing 3.

Regarding the heating of the steel sheet edge, it is only required to heat only an edge face of the steel sheet, as described above. However, since it is difficult to heat only an edge face, it is preferable to set the heating in such a way as to heat a region as close as possible to the edge face within the steel sheet edge face and a vicinity thereof, using a laser, induction heating, or the like, which are capable of locally heating a target area. Heating the steel sheet edge face causes the steel sheet edge to be heated.

Figure 3:
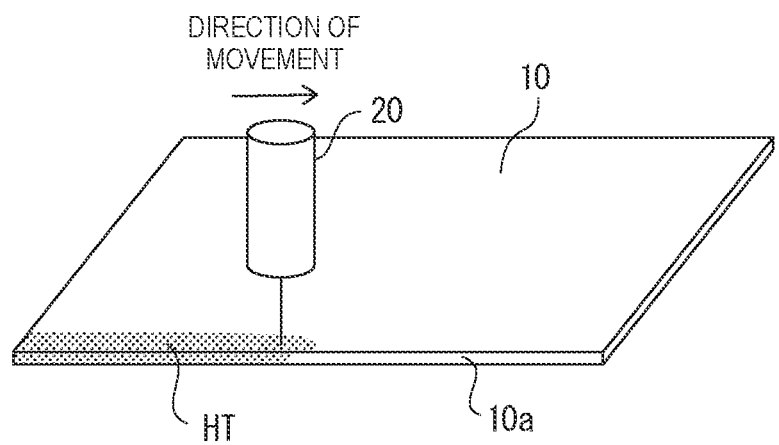
FIG. 3 is a diagram illustrative of an example of a heating method.
Figure 4:
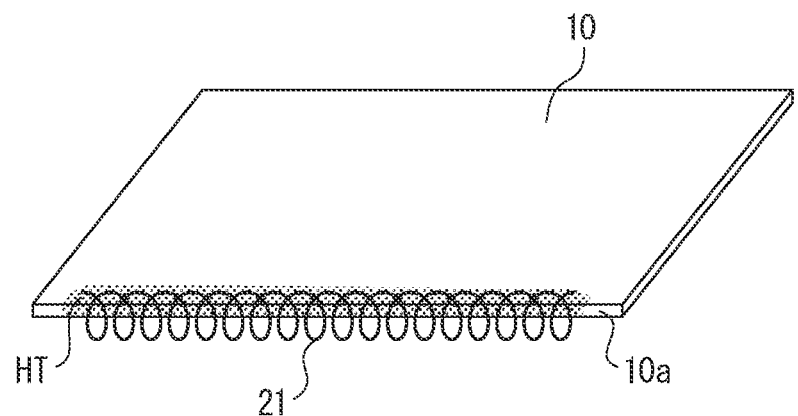
FIG. 4 is a diagram illustrative of another example of the heating method.
Figure 5:
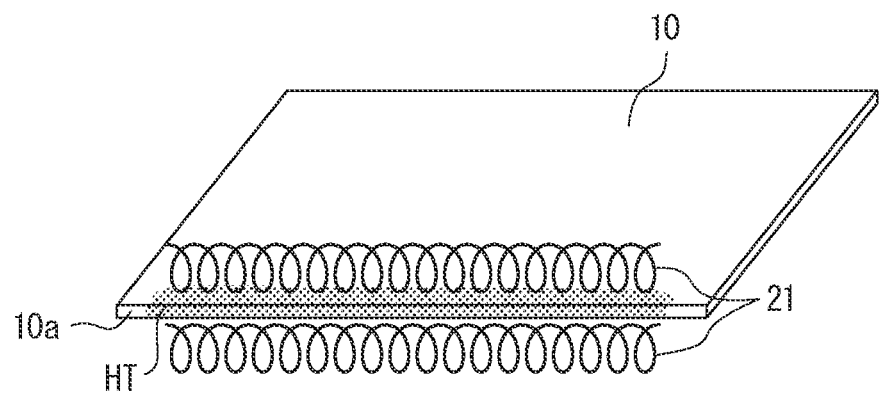
FIG. 5 is a diagram illustrative of still another example of the heating method.
Figure 6:
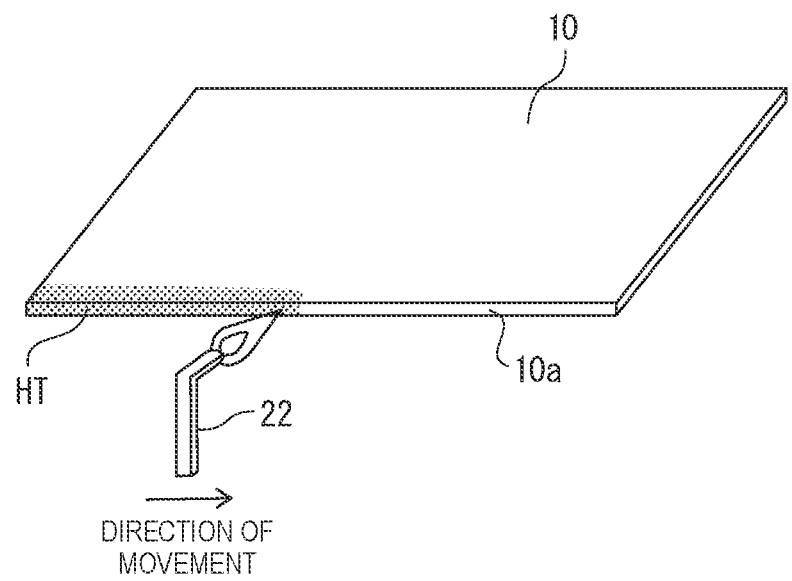
FIG. 6 is a diagram illustrative of still another example of the heating method.

Examples of a method for heating an edge of a steel sheet 10 are illustrated in FIGS. 3 to 6. A reference sign HT denotes a heated area. FIG. 3 illustrates an example of laser heating, and a steel sheet edge is heated by moving a laser transmitter 20 along an edge face 10a. FIGS. 4 and 5 illustrate examples of induction heating and exemplify cases where the edge face 10a is induction-heated by a coil 21 for induction heating from the edge face 10a side and from both the front and back surfaces of a vicinity of the edge face 10a, respectively. FIG. 6 illustrates an example when the edge face 10a is heated by means of direct heating using a burner 22. The heating method may be a method other than the laser heating, the induction heating, and the direct heating using a burner or the like, and any heating means may be employed.

Although a rate of temperature rise may be set at any rate from a viewpoint of improvement in stretch flange formability, it is preferable to set the rate of temperature rise at 10° C./sec or more from a viewpoint of mass productivity when the heating is performed in a production step. When mass productivity is not an essential aspect of the manufacturing, it is not necessary to conform to this requirement. Note that a heating rate at the time of heating is preferably a rapid heating.

In the heat treatment 1Ba, it may be configured to, after temperature of the steel sheet edge face is estimated to have reached a target heating temperature, hold the heated state for a certain period of time. Since a long holding time leads to reduction in production efficiency, the holding time is preferably five minutes or less. More preferably, the holding time is one minute or less.

Note that, in order to facilitate understanding, the shape of a blank material and a sheared edge face are illustrated by a rectangle and a straight line, respectively, in FIGS. 3 to 6. However, the shape of the blank material may be any shape, and the shape of the sheared edge face 10a is not limited to a straight line but may also be any shape, such as a curve and a shape combining a curve and a straight line.

A heating range L [mm] from an edge face position of the steel sheet 10 on a surface of the single steel sheet is, for example, set at a value within a range defined by the formula (1). In other words, a region the range of which is equal to or less than the heating range L [mm] is defined to be an edge face and a vicinity thereof constituting an edge.

$$0 \text{ mm} \leq L \leq 20 \text{ mm} \tag{1}$$

The heating range L [mm] exceeding 20 mm is not preferable because, in that case, there is a possibility that fatigue characteristics of the component deteriorate in association with softening of material strength (tensile strength). When an apparatus capable of heating only a narrower vicinity of an edge face is used, the heating range L [mm] is more preferably 5 mm or less.

From a viewpoint of suppressing trouble caused by heating, the heating range L [mm] is preferably arranged as close as possible to the edge face, and more preferably set within a range defined by the formula (2) below.

$$0 \text{ mm} \leq L \leq 8 \text{ mm} \quad (2)$$

In the present embodiment, a setting of a target heating temperature T[° C.] of a portion to be heated at the time of heating is changed as follows according to a material (microstructural composition) of a steel sheet to be used.

[Case of Steel Sheet the Principal Microstructure of which is Composed of Single Phase of Martensite]

A case where a steel sheet used in the present embodiment is a steel sheet the principal microstructure of which is composed of a single phase of martensite will be described.

The steel sheet the principal microstructure of which is composed of a single phase of martensite is, for example, a steel sheet in which 95 vol % or more, and preferably 98 vol % or more of the microstructure thereof is composed of martensite.

In the case of a steel sheet the principal microstructure of which is composed of a single phase of martensite, a target heating temperature T[° C.] is set at a value within a range of 500° C. or more and 700° C. or less. Setting the heating temperature T[° C.] at a value equal to or greater than 500° C. and equal to or less than 700° C. enables flange formability to be improved in the case of a steel sheet the principal microstructure of which is composed of a single phase of martensite (see an example).

In other words, in the present embodiment, when a steel sheet subjected to pressing is a steel sheet the principal microstructure of which is composed of a single phase of martensite, heating an edge face of the steel sheet at a temperature within the above-described proper temperature range enables stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet the principal microstructure of which is composed of a single phase of martensite, performing the above-described heating causes tempering of martensite and release of strain to occur. The tempering of martensite causes the steel sheet edge to be softened and, in conjunction therewith, the release of strain causes recovery of toughness reduced by work-hardening to occur, which causes stretch flange formability to be improved. In order to achieve the above-described effect, the heating temperature is set at 500° C. or more as described above, and preferably 600° C. or more. An upper limit temperature of the heating is set at 700° C. or less, which is a temperature range where it is estimated that recrystallization does not occur.

When a steel sheet the principal microstructure of which is composed of a single phase of martensite is used as a steel sheet, the heating range L [mm] from the edge face position of the steel sheet 10 may be set according to the heating temperature T[° C.], for example, in such away that the heating range L [mm] falls within a range defined by the formula (3) below. The heating range L from the edge face position of the steel sheet 10 is set in, for example, a direction along a steel sheet surface and orthogonal to the extending direction of the edge face.

[Math. 1]

$$10/\sqrt[3]{T} \leq L \leq 200/\sqrt[3]{T} \quad (3)$$

Preferably, the heating range L [mm] from the edge face position of the steel sheet 10 is a range satisfying the formula (4) below.

[Math. 2]

$$10/\sqrt[3]{T} \leq L \leq 150/\sqrt[3]{T} \quad (4)$$

Note, however, that the above formulae are applicable only to a case where, when a region to be heated is heated, temperature in the region reaches 500° C. or more by the heating.

When the heating range L is less than the lower limit value in the formula (3), there is a possibility that the edge of the steel sheet is not sufficiently heated and advantageous effects of the present invention cannot be sufficiently achieved. Although an upper limit of the heating range L [mm] is not specifically set from a viewpoint of improving stretch flange formability, it is preferable to set the heating range L [mm] at a value in a range of the upper limit value in the formula (3) or less because, when the heating range is set too wide, there is concern about deterioration in component performance, spot weldability, and the like due to softening of martensite of base material.

[Case of Steel Sheet the Principal Microstructure of which is Composed of Composite Microstructure of Martensite and Ferrite]

A case where a steel sheet used in the present embodiment is a steel sheet the principal microstructure of which is composed of a composite microstructure of martensite and ferrite (hereinafter, also referred to as a first composite microstructure) will be described.

The steel sheet the principal microstructure of which is composed of a composite microstructure of martensite and ferrite is, for example, a steel sheet in which less than 95 vol % of the microstructure is composed of a martensite phase, less than 3 vol % of the microstructure is composed of phases other than ferrite including a residual austenite phase, and the rest is composed of a ferrite phase.

In the case of a steel sheet the principal microstructure of which is composed of a composite microstructure of martensite and ferrite, a target heating temperature T[° C.] of a portion to be heated at the time of heating is set at a value within a range of 400° C. or more and 700° C. or less. Setting the heating temperature T[° C.] at a value equal to or greater than 400° C. and equal to or less than 700° C. enables flange formability to be improved in the case of a steel sheet composed of the first composite microstructure (see an example).

In other words, in the present embodiment, when a steel sheet subjected to pressing is a steel sheet the principal microstructure of which is composed of a composite microstructure of martensite and ferrite, heating an edge face of the steel sheet at a temperature within the above-described proper temperature range enables stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet composed of the first composite microstructure, performing the above-described heating causes tempering of martensite and release of strain to occur. In the case of a steel sheet the principal microstructure of which is composed of a composite phase, a martensite phase being tempered causes a hardness difference between the martensite phase and a ferrite phase to become small and stretch flange formability of the steel sheet to be improved. In order to achieve the above-described effect, the heating temperature T[° C.] is set at 400° C. or more as described above, preferably 500° C. or more, and more preferably 600° C. or more. An upper limit temperature of the heating is set at 700° C. or less, which is a temperature range where it is estimated that recrystallization does not occur.

When a steel sheet the principal microstructure of which is composed of a composite microstructure of martensite and ferrite is used as a steel sheet, the heating range L [mm] from the edge face position of the steel sheet 10 may be set according to the heating temperature T[° C.], for example, in such a way that the heating range L [mm] falls within a range defined by the formula (5) below. The heating range L [mm] from the edge face position of the steel sheet 10 is set in, for example, a direction along a steel sheet surface and orthogonal to the extending direction of the edge face.

[Math. 3]

$$10/\sqrt[3]{T} \leq L \leq 150/\sqrt[3]{T} \tag{5}$$

Preferably, the heating range L [mm] is a range satisfying the formula (6) below.

[Math. 4]

$$10/\sqrt[3]{T} \leq L \leq 125/\sqrt[3]{T} \tag{6}$$

Note, however, that the above formulae are applicable only to a case where, when a region to be heated is heated, temperature in the region reaches 400° C. or more by the heating.

When the heating range L [mm] is less than the lower limit value in the formula (5), there is a possibility that the edge of the steel sheet is not sufficiently heated and advantageous effects of the present invention cannot be sufficiently achieved. Although an upper limit of the heating range L [mm] is not specifically set from a viewpoint of improving stretch flange formability, it is preferable to set the heating range L [mm] at a value in a range of the upper limit value in the formula (5) or less because, when the heating range is set too wide, there is a possibility that component performance, spot weldability, and the like deteriorate due to reduction in material strength of base material due to heating.

[Case of Steel Sheet Composed of Composite Microstructure Including Residual Austenite]

A case where a steel sheet used in the present embodiment is a steel sheet composed of a composite microstructure including residual austenite (hereinafter, also referred to as a second composite microstructure) will be described.

The steel sheet composed of a composite microstructure including residual austenite is, for example, TRIP steel. Including residual austenite means that, for example, 3 vol % or more of the entire microstructure, and preferably 4 vol % or more of the entire microstructure is composed of residual austenite. The composite microstructure except the residual austenite is mainly composed of a ferrite phase, a bainite phase, and a martensite phase.

In the case of a steel sheet composed of a composite microstructure including residual austenite, a target heating temperature T[° C.] of a portion to be heated at the time of heating is set at a value within a range of 200° C. or more and 700° C. or less. Setting the heating temperature T[° C.] at a value equal to or greater than 200° C. and equal to or less than 700° C. enables flange formability to be improved in the case of a steel sheet composed of the second composite microstructure (see an example).

In other words, in the present embodiment, using a steel sheet composed of the second composite microstructure as a steel sheet subjected to pressing and heating an edge face of the steel sheet at a temperature within the above-described proper temperature range enable stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet composed of the second composite microstructure, performing the above-described heating causes tempering of martensite and release of strain to occur in the martensite phase transformed by heating. The tempering of martensite causes the steel sheet edge to be softened and toughness to be improved and, in conjunction therewith, the release of strain causes work-hardening to be reduced, which causes stretch flange formability to be improved. In order to achieve the above-described effect, the heating temperature T[° C.] is set at 200° C. or more as described above, preferably 500° C. or more, and more preferably 600° C. or more. An upper limit temperature of the heating is set at 700° C. or less, which is a temperature range where it is estimated that recrystallization does not occur.

When a steel sheet composed of a composite microstructure including residual austenite is used as a steel sheet, the heating range L [mm] from the edge face position of the steel sheet 10 may be set according to the heating temperature T[° C.], for example, in such a way that the heating range L [mm] falls within a range defined by the formula (7) below. The heating range L [mm] from the edge face position of the steel sheet 10 is set in, for example, a direction along a steel sheet surface and orthogonal to the extending direction of the edge face.

[Math. 5]

$$10/\sqrt[3]{T} \leq L \leq 120/\sqrt[3]{T} \tag{7}$$

Preferably, the heating range L [mm] is a range satisfying the formula (8) below.

[Math. 6]

$$10/\sqrt[3]{T} \leq L \leq 100/\sqrt[3]{T} \qquad (8)$$

Note, however, that the above formulae are applicable only to a case where, when a region to be heated is heated, temperature in the region reaches 200° C. or more by the heating.

When the heating range L [mm] is less than the lower limit value in the formula (7), there is a possibility that the edge of the steel sheet is not sufficiently heated and advantageous effects of the present invention cannot be sufficiently achieved. Since there is a possibility that, when the upper limit of the heating range L [mm] exceeds an upper limit value in the formula (7), ductility of the base material deteriorates due to disappearance of residual austenite in the base material and deterioration in stretch flange formability and press formability occurs, there is a possibility that advantageous effects of the present invention cannot be sufficiently achieved.

[Case of Steel Sheet the Principal Microstructure of which is Composed of Single Phase of Bainite]

A case where a steel sheet used in the present embodiment is a steel sheet the principal microstructure of which is composed of a single phase of bainite will be described.

The steel sheet the principal microstructure of which is composed of a single phase of bainite is, for example, a steel sheet in which 95 vol % or more, and preferably 98 vol % or more of the microstructure thereof is composed of bainite.

In the case of a steel sheet the principal microstructure of which is composed of a single phase of bainite, a target heating temperature T[° C.] is set at a value within a range of 400° C. or more and 700° C. or less. Setting the heating temperature T at a value equal to or greater than 400° C. and equal to or less than 700° C. enables flange formability to be improved in the case of a steel sheet the principal microstructure of which is composed of a single phase of bainite (see an example).

In other words, in the present embodiment, when a steel sheet subjected to pressing is a steel sheet the principal microstructure of which is composed of a single phase of bainite, heating an edge face of the steel sheet at a temperature within the above-described proper temperature range enables stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet composed of a single phase of bainite, performing the above-described heating causes tempering of bainite and release of strain to occur. The tempering of bainite causes the steel sheet edge to be softened and, in conjunction therewith, the release of strain causes recovery of toughness reduced by work-hardening to occur, which causes stretch flange formability to be improved. In order to achieve the above-described effect, the heating temperature T[° C.] is set at 400° C. or more as described above, preferably 500° C. or more, and more preferably 600° C. or more. An upper limit temperature of the heating is set at 700° C. or less, which is a temperature range where it is estimated that recrystallization does not occur.

When a steel sheet the principal microstructure of which is composed of a single phase of bainite is used as a steel sheet, the heating range L [mm] from the edge face position of the steel sheet 10 may be set according to the heating temperature T[° C.], for example, in such away that the heating range L [mm] falls within a range defined by the formula (9) below. The heating range L from the edge face position of the steel sheet 10 is set in, for example, a direction along a steel sheet surface and orthogonal to the extending direction of the edge face.

[Math. 7]

$$10/\sqrt[3]{T} \leq L \leq 180/\sqrt[3]{T} \qquad (9)$$

Preferably, the heating range L [mm] is a range satisfying the formula (10) below.

[Math. 8]

$$10/\sqrt[3]{T} \leq L \leq 150/\sqrt[3]{T} \qquad (10)$$

Note, however, that the above formulae are applicable only to a case where, when a region to be heated is heated, temperature in the region reaches 400° C. or more by the heating.

When the heating range L [mm] is less than the lower limit value in the formula (9), there is a possibility that the edge of the steel sheet is not sufficiently heated and advantageous effects of the present invention cannot be sufficiently achieved. Although an upper limit of the heating range L [mm] is not specifically set from a viewpoint of improving stretch flange formability, it is preferable to set the heating range L [mm] at a value in a range of the upper limit value in the formula (9) or less because, when the heating range is set too wide, there is concern about deterioration in component performance, spot weldability, and the like due to softening of bainite of base material.

[Case of Steel Sheet the Principal Microstructure of which is Composed of Single Phase of Ferrite]

A case where a steel sheet used in the present embodiment is a steel sheet the principal microstructure of which is composed of a single phase of ferrite will be described.

The steel sheet the principal microstructure of which is composed of a single phase of ferrite is, for example, a steel sheet in which 95 vol % or more, and preferably 98 vol % or more of the microstructure thereof is composed of ferrite.

In the case of a steel sheet the principal microstructure of which is composed of a single phase of ferrite, a target heating temperature T[° C.] is set at a value within a range of 400° C. or more and 700° C. or less. Setting the heating temperature T[° C.] at a value equal to or greater than 400° C. and equal to or less than 700° C. enables flange formability to be improved in the case of a steel sheet the principal microstructure of which is composed of a single phase of ferrite (see an example).

In other words, in the present embodiment, when a steel sheet subjected to pressing is a steel sheet the principal microstructure of which is composed of a single phase of ferrite, heating an edge face of the steel sheet at a temperature within the above-described proper temperature range enables stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet composed of a single phase of ferrite, performing the above-described heating causes tempering of ferrite and release of strain to occur. The tempering of ferrite causes the steel sheet edge to be softened and, in conjunction therewith, the release of strain causes recovery of toughness reduced by work-hardening to occur, which causes stretch flange formability to be improved. In order to achieve the above-described effect, the heating temperature T[° C.] is set at 400° C. or more as described above, preferably 500° C. or more, and more preferably 600° C. or more. An upper limit temperature of the heating is set at 700° C. or less, which is a temperature range where it is estimated that recrystallization does not occur.

When a steel sheet the principal microstructure of which is composed of a single phase of ferrite is used as a steel sheet, the heating range L [mm] from the edge face position of the steel sheet 10 may be set according to the heating temperature T[° C.], for example, in such a way that the heating range L [mm] falls within a range defined by the formula (11) below. The heating range L [mm] from the edge face position of the steel sheet 10 is set in, for example, a direction along a steel sheet surface and orthogonal to the extending direction of the edge face.

[Math. 9]

$$10/\sqrt[3]{T} \leq L \leq 175/\sqrt[3]{T} \qquad (11)$$

Preferably, the heating range L [mm] is a range satisfying the formula (12) below.

[Math. 10]

$$10/\sqrt[3]{T} \leq L \leq 150/\sqrt[3]{T} \qquad (12)$$

Note, however, that the above formulae are applicable only to a case where, when a region to be heated is heated, temperature in the region reaches 400° C. or more by the heating.

When the heating range L [mm] is less than the lower limit value in the formula (11), there is a possibility that the edge of the steel sheet is not sufficiently heated and advantageous effects of the present invention cannot be sufficiently achieved. Although an upper limit of the heating range L [mm] is not specifically set from a viewpoint of improving stretch flange formability, it is preferable to set the heating range L [mm] at a value in a range of the upper limit value in the formula (11) or less because, when the heating range is set too wide, there is concern about deterioration in component performance, spot weldability, and the like due to softening of ferrite of base material.

[Case of Steel Sheet the Principal Microstructure of which is Composed of Composite Microstructure of Ferrite and Pearlite]

A case where a steel sheet used in the present embodiment is a steel sheet the principal microstructure of which is composed of a composite microstructure of ferrite and pearlite (hereinafter, also referred to as a third composite microstructure) will be described.

The steel sheet the principal microstructure of which is composed of a composite microstructure of ferrite and pearlite is, for example, a steel sheet made of steel composed of a microstructure in which a sum of phase fractions of a ferrite phase and a pearlite phase is 97% or more and a phase fraction of the pearlite phase is 5% or more.

In the case of a steel sheet the principal microstructure of which is composed of a composite microstructure of ferrite and pearlite, a target heating temperature T[° C.] of a portion to be heated at the time of heating is set at a value within a range of 400° C. or more and 700° C. or less. Setting the heating temperature T[° C.] at a value equal to or greater than 400° C. and equal to or less than 700° C. enables flange formability to be improved in the case of a steel sheet composed of the third composite microstructure (see an example).

In other words, in the present embodiment, when a steel sheet subjected to pressing is a steel sheet the principal microstructure of which is composed of a composite microstructure of ferrite and pearlite, heating an edge face of the steel sheet at a temperature within the above-described proper temperature range enables stretch flange formability to be improved. A vicinity of a sheared edge face of a steel sheet that has been subjected to shearing has been subjected to heavy working that causes the microstructure to be elongated in the shearing direction, and there is concern about occurrence of work-hardening due to shearing and deterioration in stretch flange formability. In a steel sheet composed of the first-third composite microstructure, performing the above-described heating causes tempering of pearlite and release of strain to occur. In the case of a steel sheet composed of the composite phase, a pearlite phase being tempered causes a hardness difference between a ferrite phase and the pearlite phase to become small and stretch flange formability of the steel sheet to be improved. In order to achieve the above-described effect, the heating temperature T [C] is set at 400° C. or more as described above, preferably 500° C. or more, and more preferably 600° C. or more. An upper limit temperature of the heating is set at 700° C. or less, which is a temperature range where it is estimated that recrystallization does not occur.

When a steel sheet the principal microstructure of which is composed of a composite microstructure of ferrite and pearlite is used as a steel sheet, the heating range L [mm] from the edge face position of the steel sheet 10 may be set according to the heating temperature T[° C.], for example, in such a way that the heating range L [mm] falls within a range defined by the formula (13) below. The heating range L [mm] from the edge face position of the steel sheet 10 is set in, for example, a direction along a steel sheet surface and orthogonal to the extending direction of the edge face.

[Math. 11]

$$10/\sqrt[3]{T} \leq L \leq 190/\sqrt[3]{T} \qquad (13)$$

Preferably, the heating range L [mm] is a range satisfying the formula (14) below.

[Math. 12]

$$10/\sqrt[3]{T} \leq L \leq 140/\sqrt[3]{T} \qquad (14)$$

Note, however, that the above formulae are applicable only to a case where, when a region to be heated is heated, temperature in the region reaches 400° C. or more by the heating.

When the heating range L is less than the lower limit value in the formula (13), there is a possibility that the edge of the steel sheet is not sufficiently heated and advantageous effects of the present invention cannot be sufficiently achieved. Although an upper limit of the heating range L is not specifically set from a viewpoint of improving stretch flange formability, it is preferable to set the heating range L [mm] at a value in a range of the upper limit value in the formula (13) or less because, when the heating range L [mm] is set too wide, there is a possibility that component performance, spot weldability, and the like deteriorate due to reduction in material strength of base material due to heating.

(Cooling Treatment 1Bb)

In the cooling treatment 1Bb, treatment of cooling at least a heated edge of a steel sheet heated in the heat treatment 1Ba is performed.

The cooling treatment 1Bb after heat treatment may be performed by means of any of rapid cooling by water cooling or the like, air cooling, and slow cooling. The air cooling may be either natural air cooling or air cooling by means of blowing air from a nozzle. In the slow cooling, a cooling rate may be adjusted by adjusting output at the time of laser heating or induction heating.

The cooling in the cooling treatment 1Bb is performed in such a way that temperature of, for example, a heated edge face of the steel sheet becomes lower than a lower limit value of the above-described target heating temperature T[° C.], which is individually set according to the material (microstructure) of the steel sheet, preferably 100° C. or lower, and more preferably 50° C. or lower.

Through the steps described above, a steel sheet for cold press in the present embodiment is manufactured.

<Pressing Step 2>

The pressing step 2 is a step of, by subjecting a steel sheet the edge face of which has been subjected to heat and cooling treatment to cold pressing including stretch flange forming, forming a press component having a target shape.

The cold pressing forms a steel sheet into a press component having a target shape through one or two or more stages of press forming.

The cold pressing in the description means press-forming a steel sheet without heating the steel sheet during pressing and means subjecting a steel sheet to pressing by means of press forming performed while, for example, temperature of the steel sheet is lower than a lower limit value of the above-described target heating temperature T[° C.], which is individually set according to the material of the steel sheet, preferably 100° C. or lower, and more preferably 50° C. or lower.

The press component having a target shape manufactured in the pressing step 2 does not have to be a final formed product (final product shape).

<Effects and Others>

Figure 7:
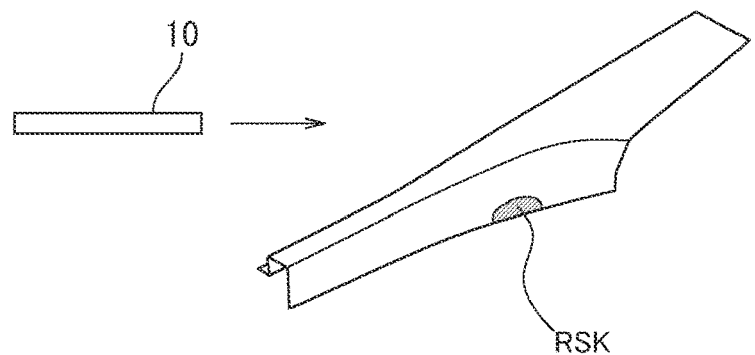
FIG. 7 is a diagram illustrative of an example of an analysis region (a region where it is estimated that a stretch flange crack is likely to occur) according to the first embodiment based on the present invention.
Figure 8A:
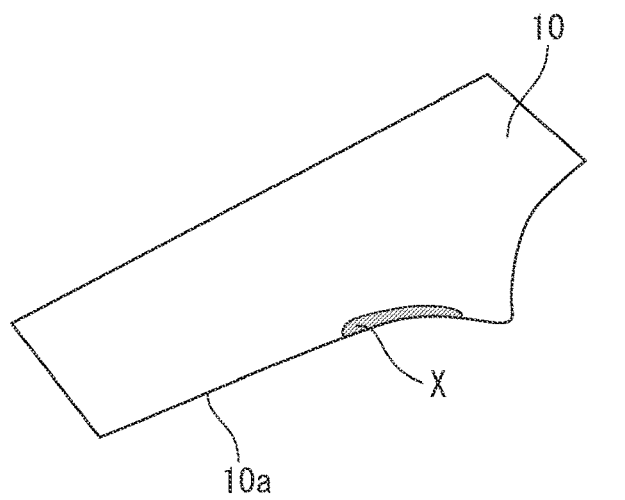
FIG. 8 is diagrams illustrative of a treatment example in the heating and cooling step and a pressing step according to the first embodiment based on the present invention.

In the present embodiment, a crack estimation region RSK where it is estimated that a stretch flange crack occurs when the steel sheet 10 after shearing is cold-pressed into a target component shape as illustrated in FIG. 7 is determined by means of computer analysis or the like, in the stretch-flange-crack region estimation processing 3 (analysis step). An analysis region X, on the steel sheet 10 having been subjected to shearing, where there is a possibility that a flange crack occurs and that corresponds to the above-described crack estimation region RSK on the press component, as illustrated in FIG. 8A is heated at the above-described heating temperature and subsequently subjected to cooling.

Figure 8B:
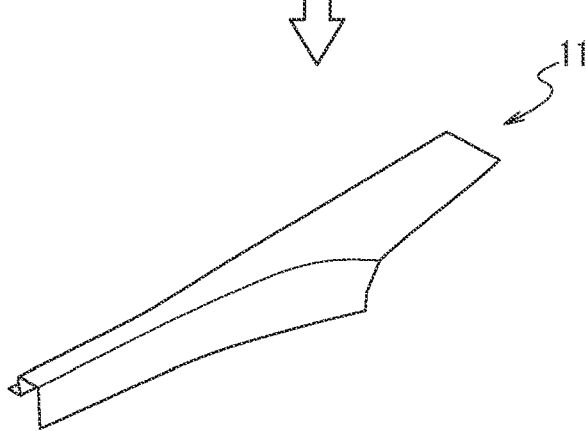

The steel sheet 10 having been subjected to the treatment as described above is press-formed into a target press component 11 that has a target component shape, by means of cold pressing, as illustrated in FIG. 8B.

A blank material 10 using a steel sheet composed of each of the above-described microstructural compositions as illustrated in FIG. 13A was simply press-formed into a press component 11, illustrated in FIG. 13B, to which deformation that causes a flange to be stretched at the time of press forming is given. When, on this occasion, the steel sheet 10 for which a high-strength steel sheet is used was press-formed, stretch flange cracks occurred at sites indicated by reference signs A in FIG. 13B. A similar result was obtained with respect to a steel sheet composed of any of the above-described microstructural compositions. Whether or not a stretch flange crack occurs depends on material strength (tensile strength), material microstructure, a sheared edge face condition, surface treatment, and the like.

The stretch flange formability depends on a cutting method used in cutting of a material edge on which a stretch flange deformation occurs. Since, when a steel sheet is cut by, for example, shearing, damage to an edge face is larger than an edge face produced by machining and the end face is formed into a non-uniform end face, there is concern that stretch flange formability deteriorates. Further, in the case of shearing, stretch flange formability also changes depending on clearance.

In the present embodiment, in order to reduce stretch flange cracks occurring due to materials and working conditions unfavorable for stretch flange forming as described above, treatment of heating at least a sheet edge face that is likely to become a starting point of a crack in shearing in a stretch flange crack risk region to a proper temperature matching a material and cooling the sheet edge face is performed on a steel sheet used in pressing, and the steel sheet having been subjected to the treatment is press-formed.

As a result, in the present embodiment, heating and cooling as a treatment before working causes the microstructure of a material to be changed, that is, the material to be softened and strain to be eliminated, at least in a stretch flange crack risk portion, which causes stretch flange formability to be improved.

In particular, targeting at least an edge face of the steel sheet within the edge face and a vicinity thereof, performing the heat treatment 1Ba for material softening and subsequently performing the cooling treatment 1Bb enable deterioration in fatigue characteristics of the component occurring in association with softening of material strength (tensile strength) due to heating to be held to a minimum.

2. Second Embodiment

Next, a second embodiment will be described.

Figure 9:
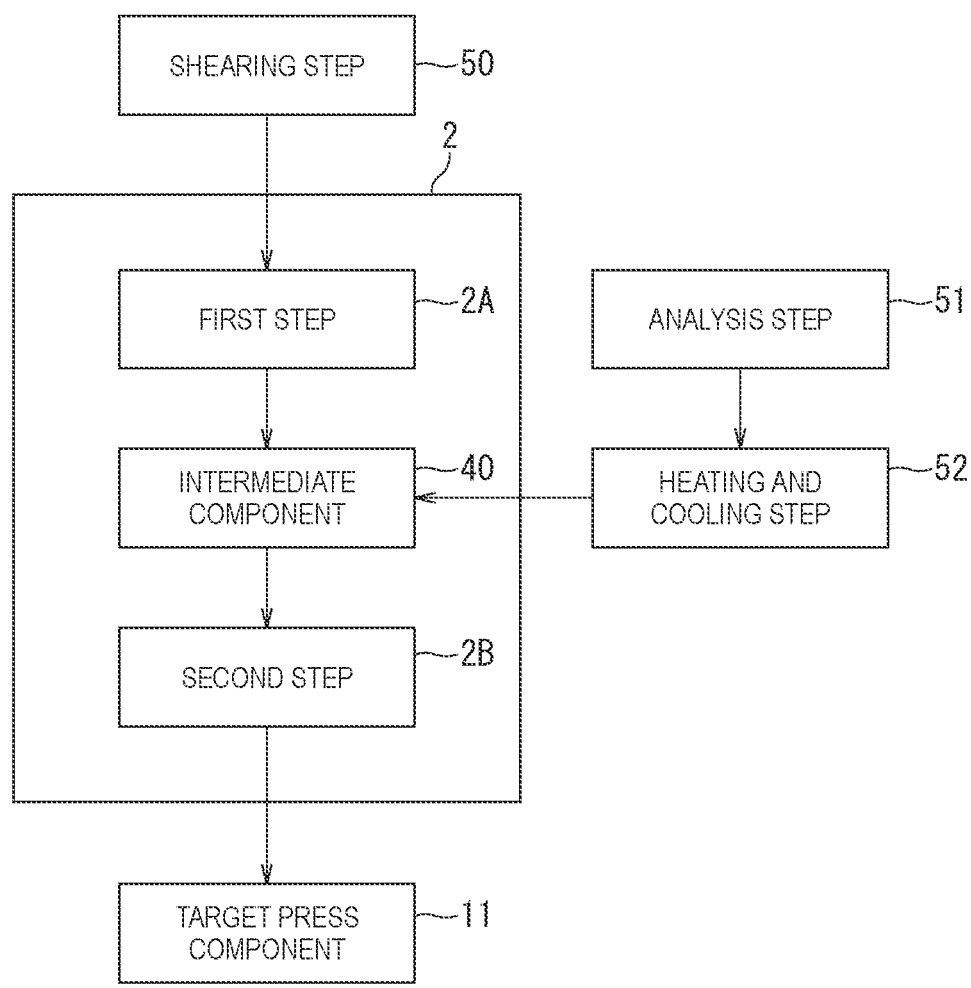
FIG. 9 is a diagram illustrative of processing blocks of a method for manufacturing a press component according to a second embodiment based on the present invention.

The present embodiment differs from the first embodiment in setting, as a target of the analysis step and the heating and cooling step of the first embodiment, an intermediate component 40 that is formed in an intermediate pressing sub-step among pressing sub-steps in a pressing step 2 (see FIG. 9). As for the rest, the present embodiment is the same as the first embodiment.

A method for manufacturing a press component of the present embodiment is a method for manufacturing a press component for manufacturing a press component having a target press component shape by subjecting a steel sheet to cold pressing. The method for manufacturing a press component of the present embodiment includes, as a cold pressing step 2, a first step 2A of press-forming a steel sheet into an intermediate component 40 and a second step 2B of press-forming the intermediate component 40 into a press component 11 having a target press component shape, as illustrated in FIG. 9.

Further, the present embodiment includes a shearing step 50, an analysis step 51, and a heating and cooling step 52, as illustrated in FIG. 9.

<Shearing Step 50>

In the shearing step 50, treatment of subjecting at least a portion of an edge of a steel sheet 10 to shearing is performed before the first step 2A.

In other words, the shearing step 50 is a step of acquiring a single steel sheet (blank material) having a target shape by trimming a steel sheet made of a piece of sheet material formed by rolling or the like into a preset blank material shape or forming an opening portion in the steel sheet by shearing, such as burring.

Only a portion of the steel sheet may be sheared. Note that the method for manufacturing a press component may include another shear treatment in which shaping of an edge face is performed after the pressing step 2 or during the pressing step 2.

<Analysis Step 51>

In the analysis step 51, a process of determining, within an edge of the intermediate component 40, a region where it is estimated that a stretch flange crack is likely to occur when the intermediate component 40 is press-formed into the target press component 11 in the second step 2B is performed.

In the analysis step 51, a process of analyzing a position of a stretch flange crack region (analysis region) is performed. The stretch flange crack region is a region where it is estimated that a stretch flange crack is likely to occur when the single steel sheet having been subjected to shear treatment in the shearing step 50 is press-formed into the intermediate component 40 in the first step 2A and, subsequently, the intermediate component 40 is press-formed into the target press component 11 in the second step 2B. A condition for a steel sheet to be analyzed requires that the steel sheet be a steel sheet that has not been subjected to a treatment in the heating and cooling step 52. Note that the stretch flange crack region is a stretch flange crack risk site.

Such a stretch flange crack region may be specified through examination by CAE analysis using a computer, based on conditions for press forming in the pressing step 2 or may be specified through actual pressing. Generally, a curved portion in plan view, a burring portion, or the like is a stretch flange crack region. Thus, a flange portion, in a region in which stretch flange forming is performed, that is formed into a shape having a predetermined radius of curvature or more by pressing may be simply specified as a stretch flange crack region (analysis region).

A timing at which the analysis step 51 is performed is not specifically limited as long as the analysis step 51 is performed before the heating and cooling step 52 is performed.

<Heating and Cooling Step 52>

In the heating and cooling step 52, treatment of, before the second step 2B, heating, within an edge of the intermediate component 40 formed in the first step 2A, a site on the edge of the intermediate component 40 included in the analysis region determined in the analysis step 51 to a temperature within a target heating temperature range set individually according to the microstructural composition of the target steel sheet and cooling the site is performed.

In other words, in the case of a steel sheet the principal microstructure of which is composed of a single phase of martensite, a target heating temperature range that is individually set is set to a temperature range of 500° C. or more and 700° C. or less.

In the case of a steel sheet the principal microstructure of which is composed of a composite microstructure of martensite and ferrite, a steel sheet the principal microstructure of which is composed of a single phase of bainite, a steel sheet the principal microstructure of which is composed of a single phase of ferrite, or a steel sheet the principal microstructure of which is composed of a composite microstructure of ferrite and pearlite, the target heating temperature range is set to a temperature range of 400° C. or more and 700° C. or less.

In the case of a steel sheet composed of a composite microstructure including residual austenite, the target heating temperature range is set to a temperature range of 200° C. or more and 700° C. or less.

The heating and cooling step 52 is pre-treatment performed before subjecting the intermediate component 40 that is made of a single steel sheet and is formed in the first step 2A to pressing in the second step 2B including stretch flange forming.

In the heating and cooling step 52, the same treatment as that in the heating and cooling step 1B in the first embodiment is performed. In other words, in the heating and cooling step 52, heat treatment and cooling treatment under the same conditions as those for the heat treatment 1Ba and the cooling treatment 1Bb in the heating and cooling step 1B in the first embodiment are performed in this order.

Note, however, that, since the treatment and conditions of the heating and cooling step 52 are the same as the treatment and conditions of the heating and cooling step 1B in the first embodiment except that a site on which the heat and cooling treatment is performed is an edge of the intermediate component 40, a description thereof will be omitted.

<Effects and Others>

Figure 10A:
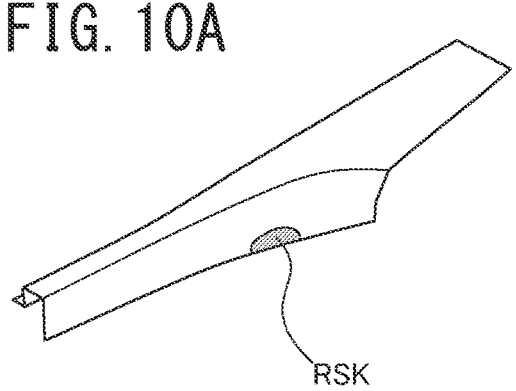
FIG. 10 is diagrams descriptive of a treatment example of the method for manufacturing a press component according to the second embodiment based on the present invention.

In the present embodiment, with respect to a sheared steel sheet, a crack estimation region RSK, within an edge of the press component 11, where it is estimated that a stretch flange crack occurs when the intermediate component 40 is cold-pressed into the target press component 11 having a target component shape in the second step 2B, as illustrated in FIG. 10A is determined by means of computer analysis or the like in advance, in the analysis step 51. Further, in the analysis step 51, an analysis region X, within the intermediate component 40, where it is estimated that a stretch flange crack occurs and that corresponds to the crack estimation region RSK is determined (see FIG. 10D).

Figure 10B:
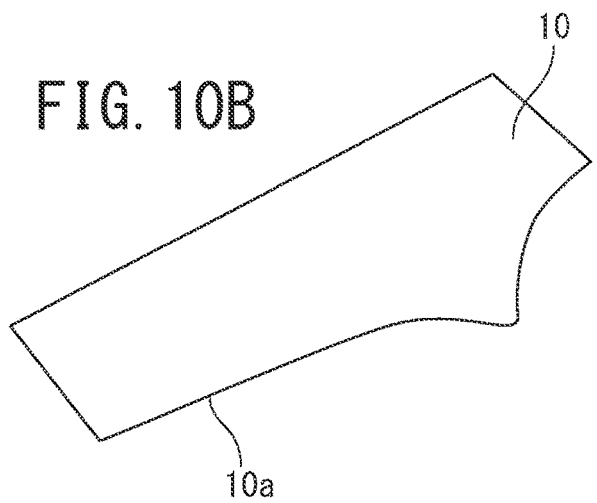
Figure 10C:
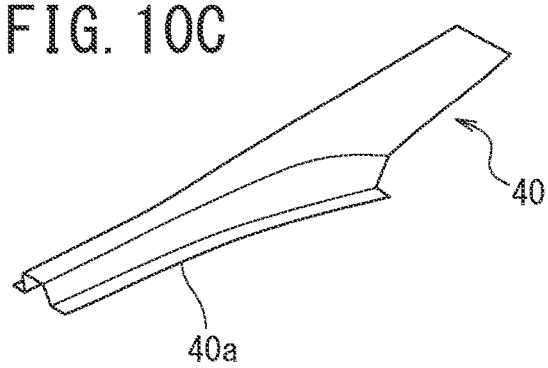
Figure 10D:
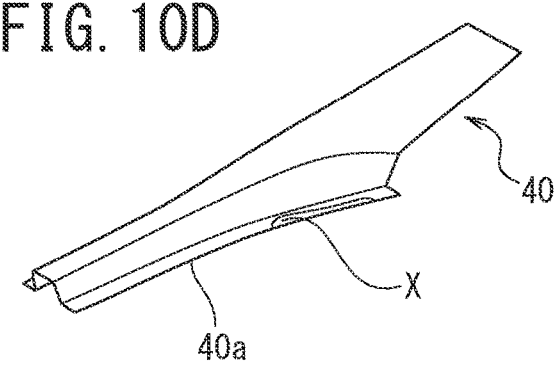

In the present embodiment, the steel sheet 10 sheared as illustrated in FIG. 10B is formed into the intermediate component 40 in the first step 2A (FIG. 10C). Subsequently, as illustrated in FIG. 10D, the analysis region X, on the edge of the intermediate component 40, that corresponds to the above-described crack estimation region RSK on the press component is heated at the above-described heating temperature and subsequently subjected to cooling.

Figure 10E:
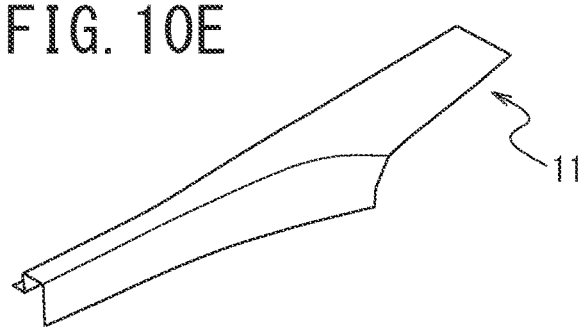

The intermediate component 40 having been subjected to the heat and cooling treatment as described above is press-formed into the target press component 11 by means of cold pressing in the second step 2B, as illustrated in FIG. 10E.

The present embodiment enables the same advantageous effects as the advantageous effects of the first embodiment to be attained.

Further, the present embodiment also enables the following advantageous effect to be attained.

That is, when the pressing step 2 is performed through a multistage press step, there is a possibility that stretch flange formability on an edge of the press component after each pressing sub-step is changed by pressing in the pressing sub-step and probability of occurrence of a crack on the final press component 11 is also changed by pressing in intermediate pressing sub-steps depending on processing conditions.

In contrast, in the present embodiment, even when a cold press step is multistage press forming, estimating presence or absence of a crack estimation region RSK with respect to a stretch flange crack on the press component 11 after the second step 2B and subjecting an analysis region X that is an edge position on the intermediate component 40 and corresponds to the crack estimation region RSK to the heat and cooling treatment enable suppression effect of a stretch flange crack on the press component 11 having a target component shape after the second step 2B to be improved.

Each of the first step 2A and the second step 2B may be composed of a plurality of press steps. In this case, pressing where it is estimated that risk of occurrence of a stretch flange crack in press forming is high may be determined through computer analysis or the like, and a press component before being formed in the pressing may be set as the above-described intermediate component 40.

In addition to the above-described heat and cooling treatment performed on the intermediate component 40, when, as in the first embodiment, it is determined in the analysis step 51 that there exists an analysis region, heat and cooling treatment as described above may also be performed on a site on an edge of the sheared steel sheet 10 before being subjected to the first step 2A, the site corresponding to the analysis region.

When the pressing step 2 includes three or more pressing sub-steps, considering each of the intermediate pressing sub-steps except the final pressing sub-step as a first step, the above-described treatment in the second embodiment may be performed.

3. Third Embodiment

Next, a third embodiment will be described.

In the third embodiment, description will be made by assigning the same reference signs to the same constituent elements as those in the second embodiment.

The present embodiment differs from the first embodiment in setting, as a target of the shearing step and the heating and cooling step of the first embodiment, an intermediate component 40 that is formed in an intermediate pressing sub-step among pressing sub-steps in a pressing step 2. As for the rest, the present embodiment is the same as the first embodiment (see FIG. 11).

A method for manufacturing a press component of the present embodiment is a method for manufacturing a press component for manufacturing a press component having a target press component shape by subjecting a steel sheet to cold pressing. The method for manufacturing a press component of the present embodiment includes, as a cold pressing step 2, a first step 2A of press-forming a steel sheet into an intermediate component 40 and a second step 2B of press-forming the intermediate component 40 into a press component 11 having a target press component shape, as illustrated in FIG. 11.

Figure 11:
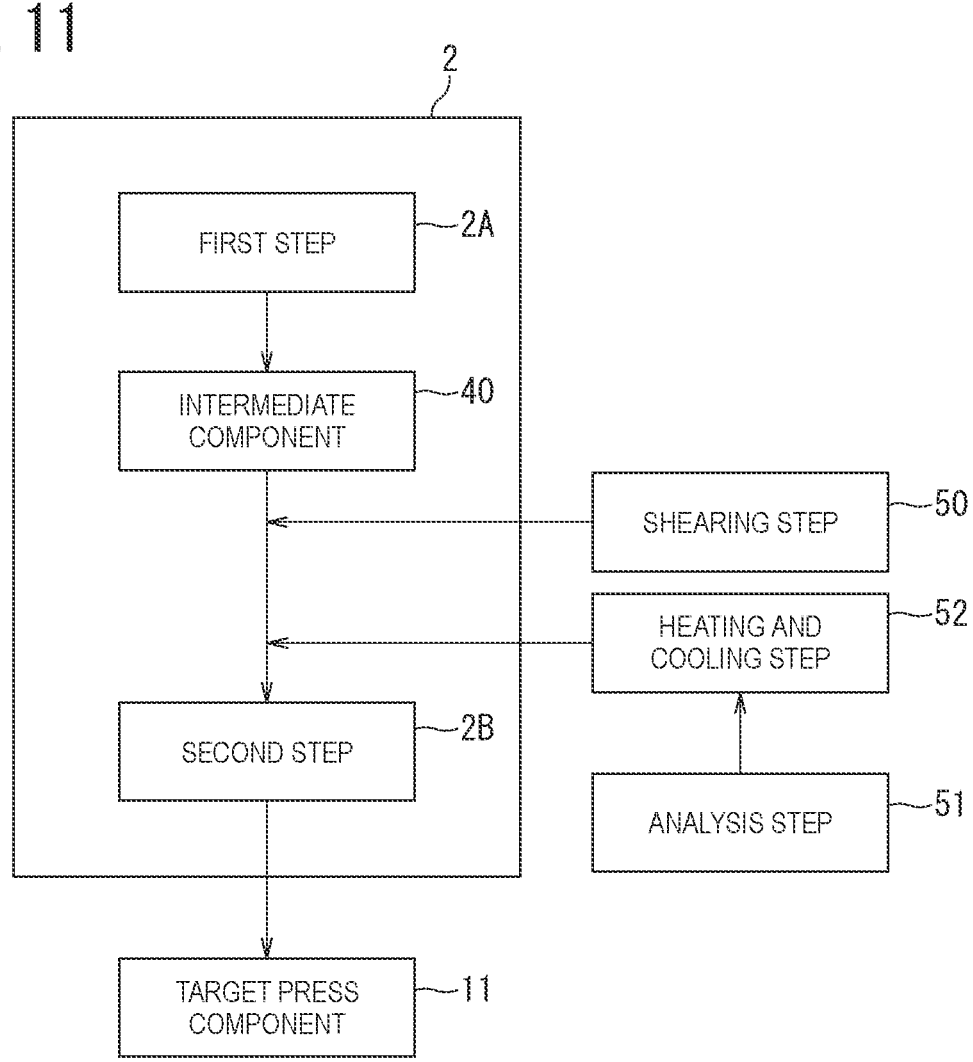
FIG. 11 is a diagram illustrative of processing blocks of a method for manufacturing a press component according to a third embodiment based on the present invention.

Further, the present embodiment includes a shearing step 50, an analysis step 51, and a heating and cooling step 52, as illustrated in FIG. 11.

<Shearing Step 50>

In the shearing step 50, treatment of subjecting at least a portion of an edge of an intermediate component after the first step 2A to shearing is performed.

The steel sheet in the first step 2A may also be subjected to other shearing separately.

<Analysis Step 51>

In the analysis step 51, a process of determining, within an edge of the intermediate component 40 after shearing, a region where it is estimated that a stretch flange crack is likely to occur when the intermediate component 40 is press-formed into the target press component 11 in the second step 2B is performed.

In the analysis step 51, a process of analyzing a position of a stretch flange crack region (analysis region) is performed. The stretch flange crack region is a region where it is estimated that a stretch flange crack is likely to occur when a single steel sheet is press-formed into the intermediate component 40 in the first step 2A, the intermediate component 40 is subjected to shearing, and, subsequently, the intermediate component 40 is press-formed into the target press component 11 in the second step 2B. A condition for the single steel sheet requires that the steel sheet be a steel sheet that has not been subjected to treatment in the heating and cooling step 1B. The single steel sheet before the first step 2A may be subjected to another shear treatment. Note that the stretch flange crack region is a stretch flange crack risk site.

Such a stretch flange crack region may be specified through examination by CAE analysis using a computer, based on conditions for press forming in the pressing step 2 or may be specified through actual pressing. Generally, a curved portion in plan view, a burring portion, or the like is a stretch flange crack region. Thus, a flange portion, in a region in which stretch flange forming is performed, that is formed into a shape having a predetermined radius of curvature or more by pressing may be simply specified as a stretch flange crack region (analysis region).

A timing at which the analysis step 51 is performed is not specifically limited as long as the analysis step 51 is performed before the heating and cooling step 52 is performed.

<Heating and Cooling Step 52>

In the heating and cooling step 52, treatment of heating, within an edge of the intermediate component 40 after having been subjected to shear treatment by the shearing step 50, a site on the edge of the intermediate component 40 included in the analysis region determined in the analysis step 51 to a temperature within a target heating temperature range set individually according to the microstructural composition of the target steel sheet and cooling the site is performed.

In other words, in the case of a steel sheet the principal microstructure of which is composed of a single phase of martensite, a target heating temperature range that is individually set is set to a temperature range of 500° C. or more and 700° C. or less.

In the case of a steel sheet the principal microstructure of which is composed of a composite microstructure of martensite and ferrite, a steel sheet the principal microstructure of which is composed of a single phase of bainite, a steel sheet the principal microstructure of which is composed of a single phase of ferrite, or a steel sheet the principal microstructure of which is composed of a composite microstructure of ferrite and pearlite, the target heating temperature range is set to a temperature range of 400° C. or more and 700° C. or less.

In the case of a steel sheet composed of a composite microstructure including residual austenite, the target heating temperature range is set to a temperature range of 200° C. or more and 700° C. or less.

The heating and cooling step 52 is pre-treatment performed after having subjected the intermediate component 40 that is made of a single steel sheet and is formed in the first step 2A to shear treatment and before subjecting the intermediate component 40 to pressing in the second step 2B including stretch flange forming.

In the heating and cooling step 52, the same treatment as that in the heating and cooling step 1B in the first embodiment is performed. In other words, in the heating and cooling step 52, heat treatment and cooling treatment under the same conditions as those for the heat treatment 1Ba and the cooling treatment 1Bb in the heating and cooling step 1B in the first embodiment are performed in this order.

Note, however, that, since the treatment and conditions of the heating and cooling step 52 are the same as the treatment and conditions of the heating and cooling step 1B in the first embodiment except that a site on which the heat and cooling treatment is performed is an edge of the intermediate component 40, a description thereof will be omitted.

<Effects and Others>

Figure 12A:
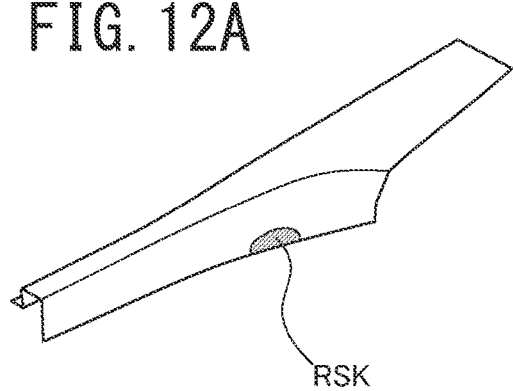
FIG. 12 is diagrams descriptive of a treatment example of the method for manufacturing a press component according to the third embodiment based on the present invention.

In the present embodiment, a crack estimation region RSK, within the target press component 11, where it is estimated that a stretch flange crack occurs when the intermediate component 40 is cold-pressed into the target press component 11 having a target component shape in the second step 2B is determined by means of computer analysis or the like in advance, in the analysis step 51, as illustrated in FIG. 12A. Further, in the analysis step 51, an analysis region X, within the intermediate component 10, where it is estimated that a stretch flange crack occurs and that corresponds to the crack estimation region RSK is determined (see FIG. 12D).

Figure 12B:
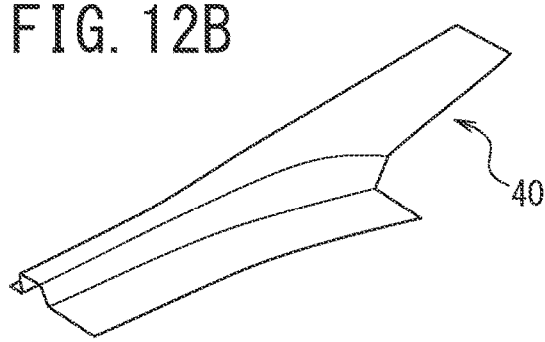
Figure 12C:
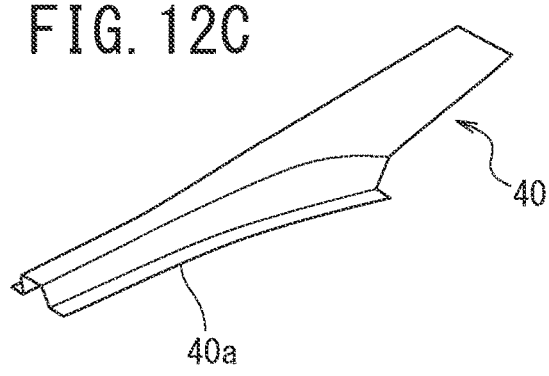

In the present embodiment, the steel sheet is formed into the intermediate component 40 in the first step 2A, as illustrated in FIG. 12B. Subsequently, a portion of an edge of the intermediate component 40 is subjected to shearing, as illustrated in FIG. 12C.

Figure 12D:
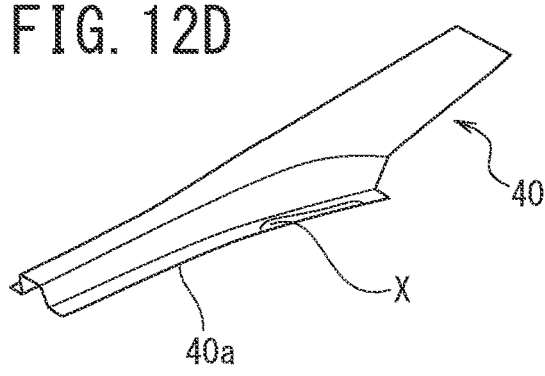

Next, as illustrated in FIG. 12D, the analysis region X, on the edge of the intermediate component 40 after shear treatment, corresponding to the above-described crack estimation region RSK on the press component 11 having a target shape is heated at the above-described heating temperature and subsequently subjected to cooling.

Figure 12E:
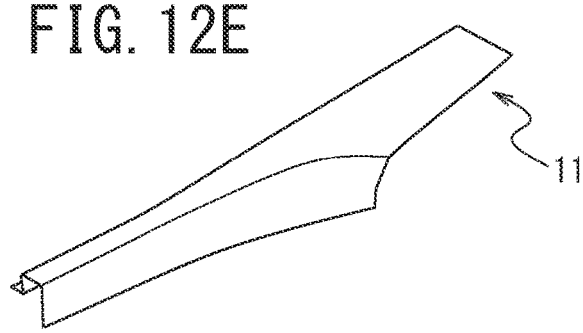

The intermediate component 40 having been subjected to the treatment as described above is press-formed into a target component shape by means of cold pressing in the second step 2B, as illustrated in FIG. 12E.

The present embodiment enables the same advantageous effects as the advantageous effects of the first embodiment to be attained.

Further, the present embodiment also enables the following advantageous effect to be attained.

That is, even when the pressing step 2 is performed through a multistage cold press step and an edge of a press component (intermediate component 40) formed in an intermediate press sub-step is subjected to shear treatment (trimming treatment), the present embodiment enables deterioration in stretch flange formability of an edge of the press component due to the shear treatment to be coped with. As a result, it becomes possible to improve suppression effect of a stretch flange crack on a target component shape after the second step 2B.

Each of the first step 2A and the second step 2B may be composed of a plurality of press steps.

In addition to the above-described heat and cooling treatment performed on the intermediate component 40, when, as in the first embodiment, it is determined in the analysis step 51 that there exists an analysis region due to press forming in the second step 2B, heat and cooling treatment as described above may also be performed on an analysis region X corresponding to an edge of the steel sheet 10 before being subjected to the first step 2A.

When the pressing step 2 includes three or more pressing sub-steps, it may be configured such that, considering each of the intermediate pressing sub-steps except the final pressing sub-step as a first step, the above-described treatment in the third embodiment is performed.

EXAMPLES

Example 1

In order to confirm improvement effect of stretch flange formability enabled by applying the present invention when a steel sheet the principal microstructure of which is composed of a single phase of martensite is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmφ opened at the center of the blank material, as illustrated in FIG. 14, was used as a specimen 30. As for the sample used in the present example, a high-strength steel sheet the sheet thickness t of which is 1.2 mm, the tensile strength of which is on the order of 1180 MPa, and the principal microstructure of which is composed of a single phase of martensite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

Figure 15A:
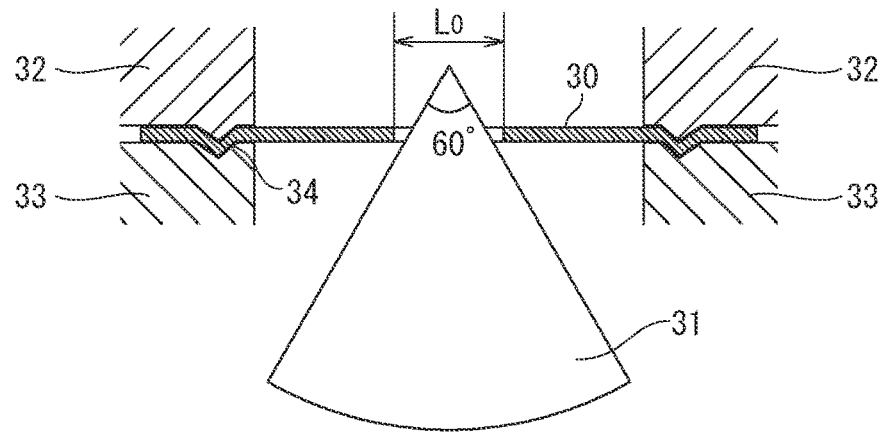
FIG. 15 is diagrams descriptive of an outline of a hole expansion test.
Figure 15B:
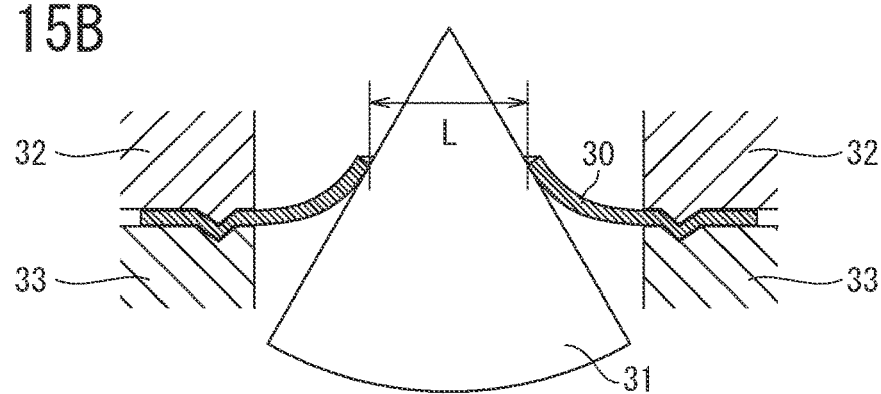

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was calculated from a ratio of an average value L of measured values of the expanded hole diameter to an initial hole diameter $L_0$.

This test was performed multiple times with a heating temperature condition changed.

The 10 mmφ hole, which was opened at the center of the specimen 30, was formed by shearing using a 10 mmφ punch.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 16:
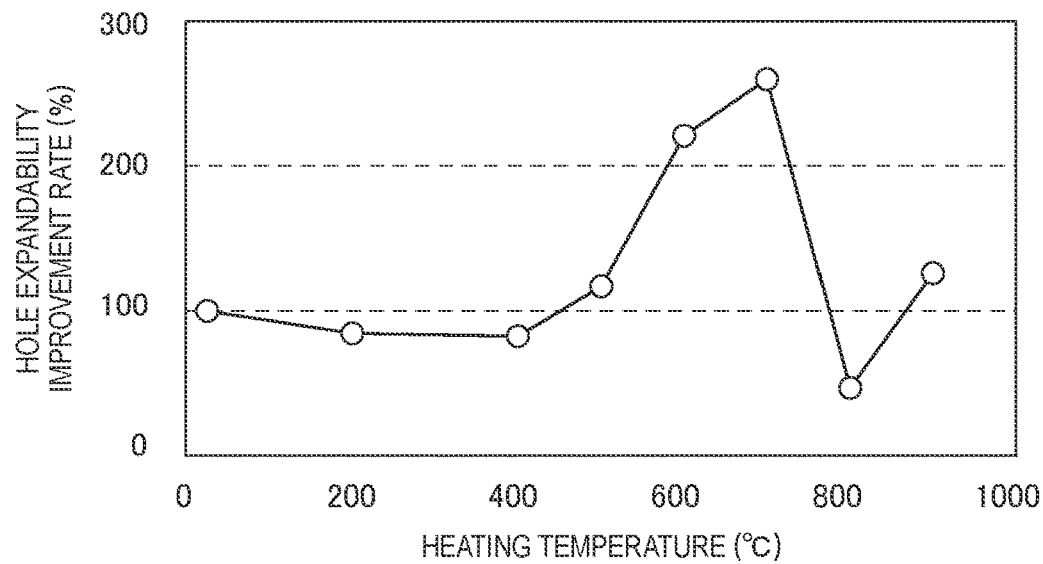
FIG. 16 is a diagram illustrative of a relationship between heating temperature in a heating and cooling step and a hole expandability improvement rate in the case of a steel sheet the principal microstructure of which is composed of a single phase of martensite.

A result of the test is illustrated in FIG. 16. FIG. 16 is a diagram illustrative of a relationship between the heating temperature and change in the hole expansion ratio.

In FIG. 16, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 16, it is revealed that, when a steel sheet the principal microstructure of which is composed of a single phase of martensite was used, improvement in the hole expansion ratio certainly increased at a heating temperature of 500° C. or more and the hole expansion ratio substantially fell when the specimen 30 was heated to 800° C. From the result described above, it is revealed that heating the steel sheet to a temperature within a temperature range of 500° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 500° C. or more and 700° C. or less caused a hole expandability improvement rate to rise.

Example 2

Using a manufacturing method based on the treatment of the first embodiment for a steel sheet the principal microstructure of which is composed of a single phase of martensite, a steel sheet 10 that was sheared as illustrated in FIG. 8A was press-formed into a press component 11 having a target press component shape illustrated in FIG. 8B.

Note that, as for a steel sheet used, a high-strength steel sheet the sheet thickness t of which is 1.2 mm, the tensile strength of which is on the order of 1180 MPa, and the principal microstructure of which is composed of a single phase of martensite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 400° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 400° C., and 800° C.

Example 3

Using a manufacturing method based on the treatment of the second embodiment for a steel sheet the principal microstructure of which is composed of a single phase of martensite, a steel sheet 10 that was sheared as illustrated in FIG. 10B was press-formed into a press component 11 having a target press component shape by way of an intermediate component 40, as illustrated in FIGS. 10C to 10E in sequence.

Note that, as for a steel sheet used, a high-strength steel sheet the sheet thickness t of which is 1.2 mm, the tensile strength of which is on the order of 1180 MPa, and the principal microstructure of which is composed of a single phase of martensite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 400° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 400° C., and 800° C.

Example 4

Using a manufacturing method based on the treatment of the third embodiment for a steel sheet the principal microstructure of which is composed of a single phase of martensite, a steel sheet that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for a steel sheet used, a high-strength steel sheet the sheet thickness t of which is 1.2 mm, the tensile strength of which is on the order of 1180 MPa, and the principal microstructure of which is composed of a single phase of martensite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 12E.

The above heating was performed at, as a predetermined heating temperature, each of no heating, 400° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 400° C., and 800° C.

Example 5

In order to confirm improvement effect of stretch flange formability enabled by applying the present invention when a steel sheet composed of the first composite microstructure is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmϕ opened at the center of the blank material, as illustrated in FIG. 14, was used as a specimen 30. As for the sample used in the present example, a high-strength steel sheet the sheet thickness t of which is 1.2 mm, the tensile strength of which is on the order of 1180 MPa, and the principal microstructure of which is composed of a composite microstructure of martensite and ferrite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was determined from a ratio of an average value L of measured values of the expanded hole diameter to an initial hole diameter $L_0$.

This test was performed multiple times with a heating temperature condition changed.

The 10 mmϕ hole, which was opened at the center of the specimen 30, was formed by shearing using a 10 mmϕ punch.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 17:
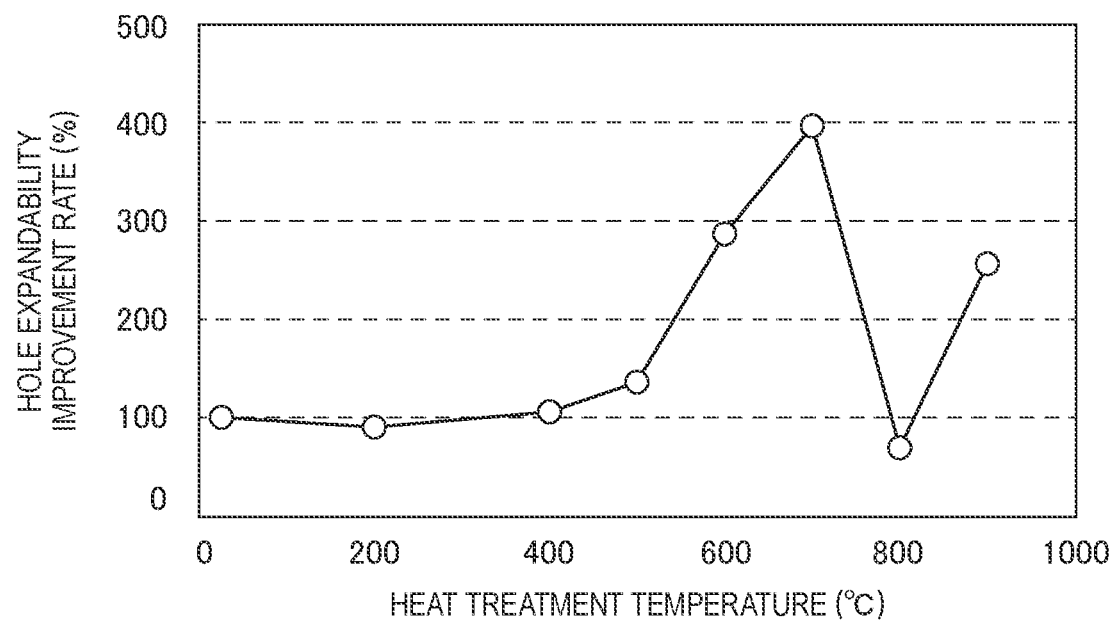
FIG. 17 is a diagram illustrative of a relationship between the heating temperature in the heating and cooling step and the hole expandability improvement rate in the case of a steel sheet the principal microstructure of which is composed of a composite microstructure of martensite and ferrite.

A result of the test is illustrated in FIG. 17. FIG. 17 is a diagram illustrative of a relationship between the heating temperature and change in the hole expansion ratio.

In FIG. 17, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 17, it is revealed that, when a steel sheet the principal microstructure of which is composed of a composite microstructure of martensite and ferrite was used, improvement in the hole expansion ratio increased at a heating temperature of 400° C. or more, and preferably 500° C. or more, and the hole expansion ratio substantially fell when the specimen 30 was heated to 800° C. From the result described above, it is revealed that heating the steel sheet to a temperature within a temperature range of 400° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 400° C. or more and 700° C. or less caused a hole expandability improvement rate to rise.

Example 6

Using a manufacturing method based on the treatment of the first embodiment for a steel sheet composed of the first composite microstructure, a steel sheet 10 that was sheared as illustrated in FIG. 8A was press-formed into a press component 11 having a target press component shape illustrated in FIG. 8B.

Note that, as for the steel sheet used, a high-strength steel sheet the sheet thickness t of which is 1.2 mm, the tensile strength of which is on the order of 1180 MPa, and the principal microstructure of which is composed of a composite microstructure of martensite and ferrite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 350° C., and 800° C.

Example 7

Using a manufacturing method based on the treatment of the second embodiment for a steel sheet composed of the first composite microstructure, a steel sheet 10 that was sheared as illustrated in FIG. 10B was press-formed into a press component 11 having a target press component shape by way of an intermediate component 40, as illustrated in FIGS. 10C to 10E in sequence.

Note that, as for the steel sheet used, a high-strength steel sheet the sheet thickness t of which is 1.2 mm, the tensile strength of which is on the order of 1180 MPa, and the principal microstructure of which is composed of a composite microstructure of martensite and ferrite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 350° C., and 800° C.

Example 8

Using a manufacturing method based on the treatment of the third embodiment for a steel sheet composed of the first composite microstructure, a steel sheet 10 that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for the steel sheet used, a high-strength steel sheet the sheet thickness t of which is 1.2 mm, the tensile strength of which is on the order of 1180 MPa, and the principal microstructure of which is composed of a composite microstructure of martensite and ferrite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 10E.

The above heating was performed at, as a predetermined heating temperature, each of no heating, 350° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 350° C., and 800° C.

Example 9

In order to confirm improvement effect of stretch flange formability enabled by applying the present invention when a steel sheet composed of the second composite microstructure is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmφ opened at the center of the blank material, as illustrated in FIG. 14, was used as a specimen 30. As for the sample used in the present example, a high-strength steel sheet the sheet thickness t of which is 1.2 mm, the tensile strength of which is on the order of 1180 MPa, and the principal microstructure of which is composed of a composite microstructure including residual austenite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was determined from a ratio of an average value L of measured values of the expanded hole diameter to an initial hole diameter $L_0$.

This test was performed multiple times with a heating temperature condition changed.

The 10 mmφ hole, which was opened at the center of the specimen 30, was formed by shearing using a 10 mmφ punch.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 18:
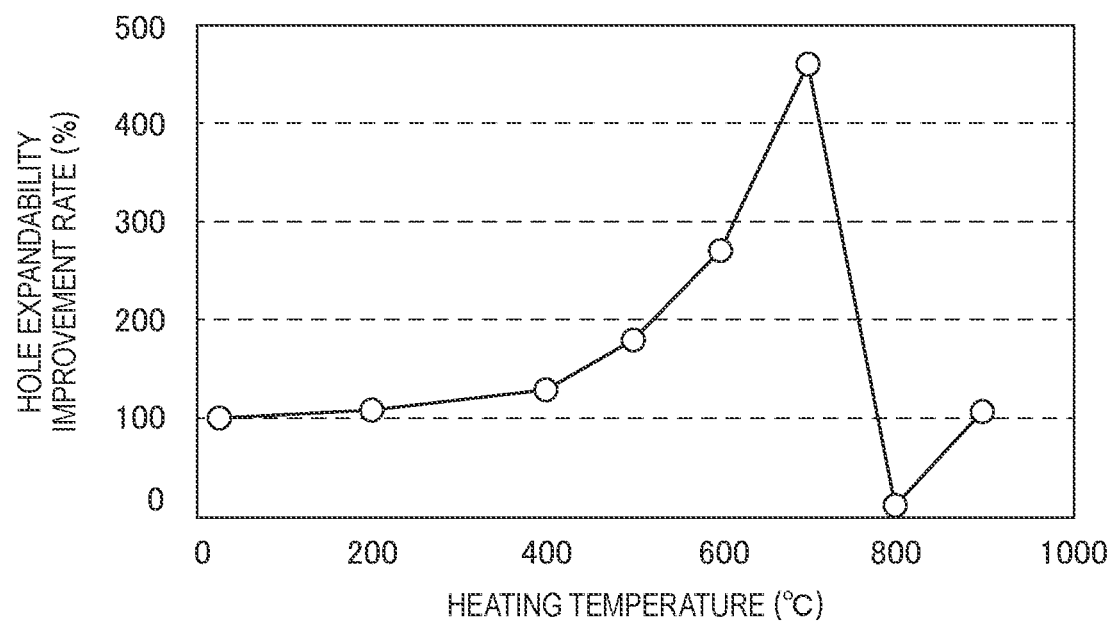
FIG. 18 is a diagram illustrative of a relationship between the heating temperature in the heating and cooling step and the hole expandability improvement rate in the case of a steel sheet composed of a composite microstructure including residual austenite.

A result of the test is illustrated in FIG. 18. FIG. 18 is a diagram illustrative of a relationship between the heating temperature and change in the hole expansion ratio.

In FIG. 18, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 18, it is revealed that, when a steel sheet composed of a composite microstructure including residual austenite was used, improvement in the hole expansion ratio increased at a heating temperature of 200° C. or more, and preferably 500° C. or more, and the hole expansion ratio substantially fell when the specimen 30 was heated to 800° C. From the result described above, it is revealed that heating the steel sheet to a temperature within a temperature range of 200° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 200° C. or more and 700° C. or less caused a hole expandability improvement rate to rise.

Example 10

Using a manufacturing method based on the treatment of the first embodiment for a steel sheet composed of the second composite microstructure, a steel sheet 10 that was sheared as illustrated in FIG. 8A was press-formed into a press component 11 having a target press component shape illustrated in FIG. 8B.

Note that, as for the steel sheet used, a high-strength steel sheet the sheet thickness t of which is 1.2 mm, the tensile strength of which is on the order of 1180 MPa, and that is composed of a composite microstructure including residual austenite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 180° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 180° C., and 800° C.

Example 11

Using a manufacturing method based on the treatment of the second embodiment for a steel sheet composed of the second composite microstructure, a steel sheet 10 that was sheared as illustrated in FIG. 10B was press-formed into a press component 11 having a target press component shape by way of an intermediate component 40, as illustrated in FIGS. 10C to 10E in sequence.

Note that, as for the steel sheet used, a high-strength steel sheet the sheet thickness t of which is 1.2 mm, the tensile strength of which is on the order of 1180 MPa, and that is composed of a composite microstructure including residual austenite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 180° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 180° C., and 800° C.

Example 12

Using a manufacturing method based on the treatment of the third embodiment for a steel sheet composed of the second composite microstructure, a steel sheet that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for the steel sheet used, a high-strength steel sheet the sheet thickness t of which is 1.2 mm, the tensile strength of which is on the order of 1180 MPa, and that is composed of a composite microstructure including residual austenite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 10E.

The above heating was performed at, as a predetermined heating temperature, each of no heating, 180° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 180° C., and 800° C.

Example 13

In order to confirm improvement effect of stretch flange formability enabled by applying the present invention when a steel sheet the principal microstructure of which is composed of a single phase of bainite is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmϕ opened at the center of the blank material, as illustrated in FIG. 14, was used as a specimen 30. On this occasion, the test was performed using two types of specimens, namely a specimen in which a hole was sheared using a 10 mmϕ punch and a specimen in which a hole was sheared using a 9.8 mmϕ punch and, subsequently, the hole was enlarged to a hole with a diameter of 10 mmϕ by mechanically cutting the circumference of the hole by 1 mm.

As for the sample used in the present example, a high-strength steel sheet the sheet thickness t of which is 1.2 mm, the tensile strength of which is on the order of 780 MPa, and the principal microstructure of which is composed of a single phase of bainite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was calculated from a ratio of an average value L of measured values of the expanded hole diameter to an initial hole diameter $L_0$.

This test was performed multiple times with a heating temperature condition changed.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 19:
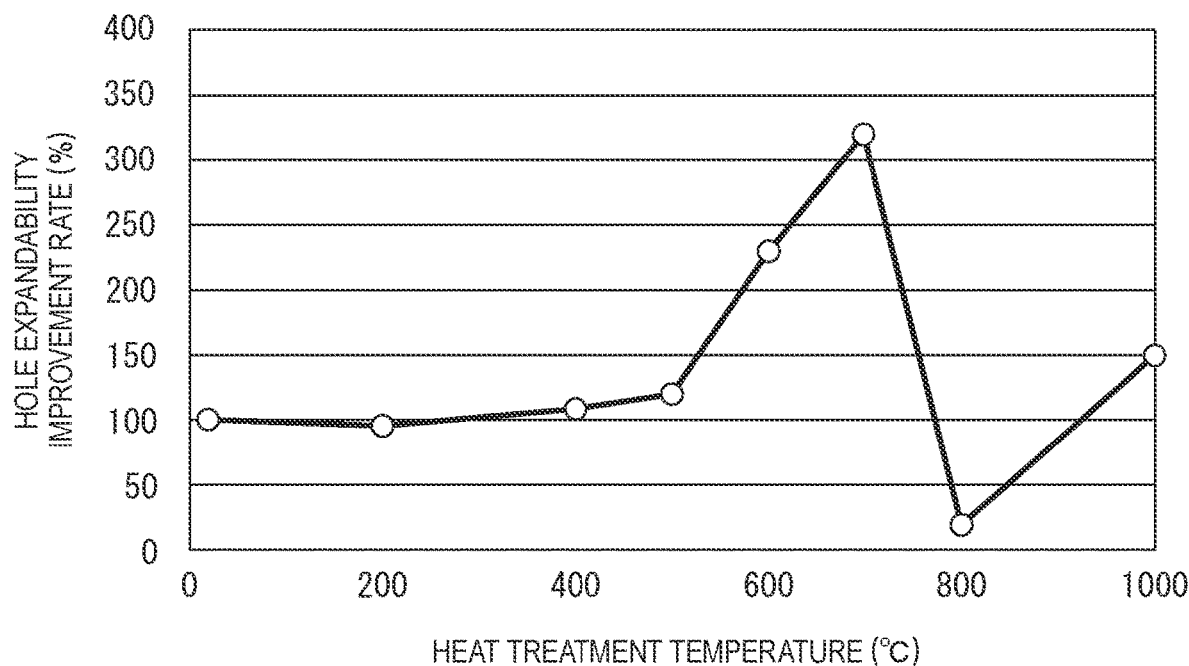
FIG. 19 is a diagram illustrative of a relationship between the heating temperature in the heating and cooling step and the hole expandability improvement rate in the case of a steel sheet the principal microstructure of which is composed of a single phase of bainite.

A result of the test is illustrated in FIG. 19. FIG. 19 is a diagram illustrative of a relationship between the heating temperature and change in the hole expansion ratio.

In FIG. 19, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 19, it is revealed that, when a steel sheet the principal microstructure of which is composed of a single phase of bainite was used, improvement in the hole expansion ratio certainly increased at a heating temperature of 400° C. or more and the hole expansion ratio substantially fell when the specimen 30 was heated to 800° C. From the result described above, it is revealed that heating the steel sheet to a temperature within a temperature range of 400° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 400° C. or more and 700° C. or less caused a hole expandability improvement rate to rise.

Example 14

Using a manufacturing method based on the treatment of the first embodiment for a steel sheet the principal microstructure of which is composed of a single phase of bainite, a steel sheet 10 that was sheared as illustrated in FIG. 8A was press-formed into a press component 11 having a target press component shape illustrated in FIG. 8B.

Note that, as for a steel sheet used, a high-strength steel sheet the sheet thickness t of which is 1.2 mm, the tensile strength of which is on the order of 780 MPa, and the principal microstructure of which is composed of a single phase of bainite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 350° C., and 800° C.

Example 15

Using a manufacturing method based on the treatment of the second embodiment for a steel sheet the principal microstructure of which is composed of a single phase of bainite, a steel sheet 10 that was sheared as illustrated in FIG. 10B was press-formed into a press component 11 having a target press component shape by way of an intermediate component 40, as illustrated in FIGS. 10C to 10E in sequence.

Note that, as for a steel sheet used, a high-strength steel sheet the sheet thickness t of which is 1.2 mm, the tensile strength of which is on the order of 780 MPa, and the principal microstructure of which is composed of a single phase of bainite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 350° C., and 800° C.

Example 16

Using a manufacturing method based on the treatment of the third embodiment for a steel sheet the principal microstructure of which is composed of a single phase of bainite, a steel sheet that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for a steel sheet used, a high-strength steel sheet the sheet thickness t of which is 1.2 mm, the tensile strength of which is on the order of 780 MPa, and the principal microstructure of which is composed of a single phase of bainite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 10E.

The above heating was performed at, as a predetermined heating temperature, each of no heating, 350° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 350° C., and 800° C.

Example 17

In order to confirm improvement effect of stretch flange formability enabled by applying the present invention when a steel sheet the principal microstructure of which is composed of a single phase of ferrite is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmϕ opened at the center of the blank material, as illustrated in FIG. 14, was used as a specimen 30. On this occasion, the test was performed using two types of specimens, namely a specimen in which a hole was sheared using a 10 mmϕ punch and a specimen in which a hole was sheared using a 9.8 mmϕ punch and, subsequently, the hole was enlarged to a hole with a diameter of 10 mmϕ by mechanically cutting the circumference of the hole by 1 mm.

As for the sample used in the present example, a high-strength steel sheet the sheet thickness t of which is 1.2 mm, the tensile strength of which is on the order of 780 MPa, and the principal microstructure of which is composed of a single phase of ferrite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was calculated from a ratio of an average value L of measured values of the expanded hole diameter to an initial hole diameter $L_0$.

This test was performed multiple times with a heating temperature condition changed.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 20:
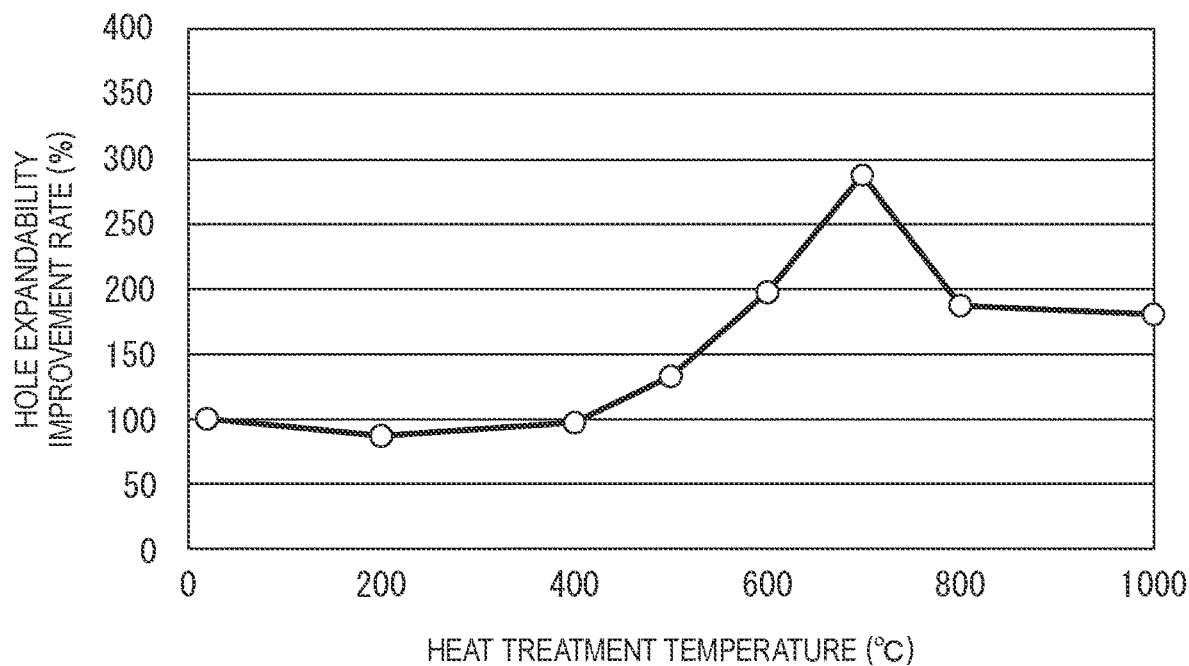
FIG. 20 is a diagram illustrative of a relationship between the heating temperature in the heating and cooling step and the hole expandability improvement rate in the case of a steel sheet the principal microstructure of which is composed of a single phase of ferrite.

A result of the test is illustrated in FIG. 20. FIG. 20 is a diagram illustrative of a relationship between the heating temperature and change in the hole expansion ratio.

In FIG. 20, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 20, it is revealed that, when a steel sheet the principal microstructure of which is composed of a single phase of ferrite was used, improvement in the hole expansion ratio certainly increased at a heating temperature of 400° C. or more and the hole expansion ratio substantially fell when the specimen 30 was heated to 800° C. From the result described above, it is revealed that heating the steel sheet to a temperature within a temperature range of 400° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 400° C. or more and 700° C. or less caused a hole expandability improvement rate to rise.

Example 18

Using a manufacturing method based on the treatment of the first embodiment for a steel sheet the principal microstructure of which is composed of a single phase of ferrite, a steel sheet 10 that was sheared as illustrated in FIG. 8A was press-formed into a press component 11 having a target press component shape illustrated in FIG. 8B.

Note that, as for a steel sheet used, a high-strength steel sheet the sheet thickness t of which is 1.2 mm, the tensile strength of which is on the order of 780 MPa, and the principal microstructure of which is composed of a single phase of ferrite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 350° C., and 800° C.

Example 19

Using a manufacturing method based on the treatment of the second embodiment for a steel sheet the principal microstructure of which is composed of a single phase of ferrite, a steel sheet 10 that was sheared as illustrated in FIG. 10B was press-formed into a press component 11 having a target press component shape by way of an intermediate component 40, as illustrated in FIGS. 10C to 10E in sequence.

Note that, as for a steel sheet used, a high-strength steel sheet the sheet thickness t of which is 1.2 mm, the tensile strength of which is on the order of 780 MPa, and the principal microstructure of which is composed of a single phase of ferrite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 350° C., and 800° C.

Example 20

Using a manufacturing method based on the treatment of the third embodiment for a steel sheet the principal microstructure of which is composed of a single phase of ferrite, a steel sheet that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for a steel sheet used, a high-strength steel sheet the sheet thickness t of which is 1.2 mm, the tensile strength of which is on the order of 780 MPa, and the principal microstructure of which is composed of a single phase of ferrite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 10E.

The above heating was performed at, as a predetermined heating temperature, each of no heating, 350° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 350° C., and 800° C.

Example 21

In order to confirm improvement effect of stretch flange formability enabled by applying the present invention when a steel sheet composed of the third composite microstructure is subjected to pressing, a hole expansion test was performed after a specimen for the hole expansion test had been heated and cooled by air cooling. Details of the hole expansion test will be described below.

A sample made of a steel sheet is used as an object of the hole expansion test. The sample that is made of a blank material having a square shape with sides of 100 mm×100 mm and has a hole with a diameter of 10 mmϕ opened at the center of the blank material, as illustrated in FIG. 14, was used as a specimen 30. On this occasion, the test was performed using two types of specimens, namely a specimen in which a hole was sheared using a 10 mmϕ punch and a specimen in which a hole was sheared using a 9.8 mmϕ punch and, subsequently, the hole was enlarged to a hole with a diameter of 10 mmφ by mechanically cutting the circumference of the hole by 1 mm.

As for the sample used in the present example, a high-strength steel sheet the sheet thickness t of which is 1.2 mm, the tensile strength of which is on the order of 780 MPa, and the principal microstructure of which is composed of a composite microstructure of ferrite and pearlite was used.

Imitating pressing including stretch flange forming, a conical hole expansion test using a conical punch was performed on the produced specimen 30, as illustrated in FIG. 15, and stretch flange formability was evaluated. In the conical hole expansion test, a conical punch with a vertex angle of 60° was used, and the specimen 30 was fixed using a lock bead 34 in such a way that material inflow does not occur. In FIG. 15, reference signs 32 and 33 denote a die and a blank material holder, respectively.

While observing the specimen 30, which is a sample, from above, a punch 31 was raised from a state illustrated in FIG. 15A and hole expansion was thereby performed, and, at a point of time when a thickness-direction penetration crack was visually recognized, the raising of the punch 31 was stopped (see FIG. 15B). The sample was removed from a tester after a hole expansion test had been finished, hole diameter after test was measured at four points, using a vernier caliper, and a hole expansion ratio was calculated from a ratio of an average value L of measured values of the expanded hole diameter to an initial hole diameter $L_0$.

This test was performed multiple times with a heating temperature condition changed.

In the heat and cooling treatment, the sample with a thermocouple attached thereto was dipped into a salt bath tank kept at a predetermined temperature, and the specimen 30 was heated to a target temperature and subsequently cooled by air cooling, and was used as a specimen 30 for the hole expansion test.

Figure 21:
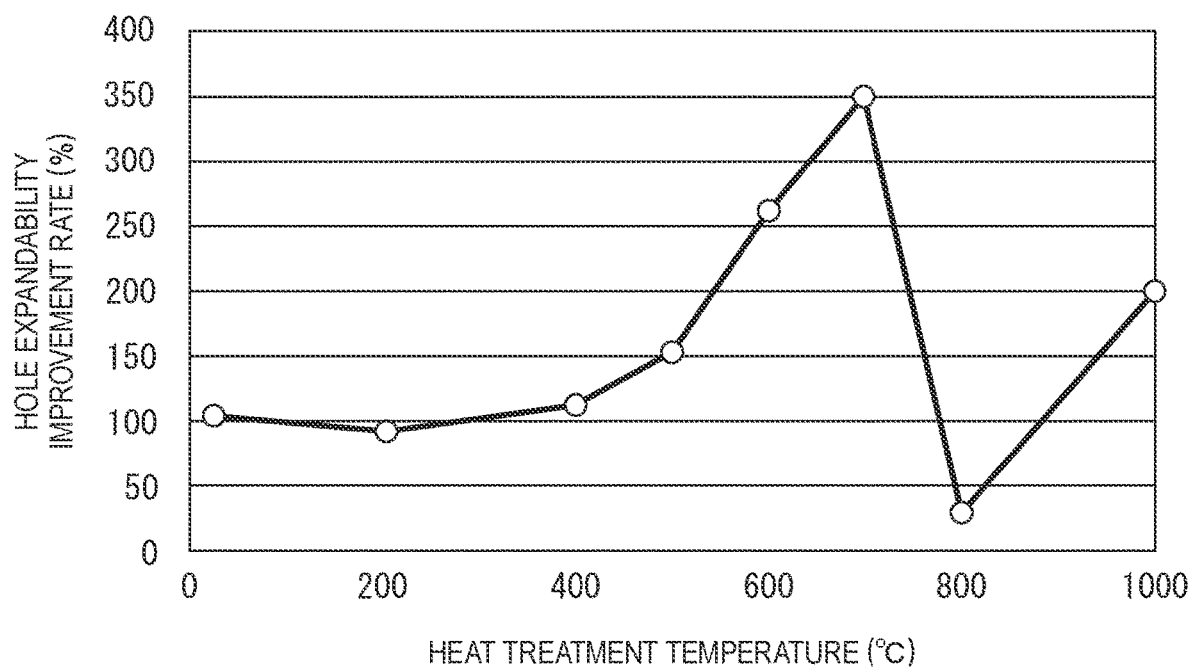
FIG. 21 is a diagram illustrative of a relationship between the heating temperature in the heating and cooling step and the hole expandability improvement rate in the case of a steel sheet the principal microstructure of which is composed of a composite microstructure of ferrite and pearlite.

A result of the test is illustrated in FIG. 21. FIG. 21 is a diagram illustrative of a relationship between the heating temperature and change in the hole expansion ratio.

In FIG. 21, the ordinate represents a change rate of the hole expansion ratio (hole expandability improvement rate) from a hole expansion ratio at room temperature. The hole expandability improvement rate being less than 100% indicates that the hole expandability has deteriorated compared with an unheated state. The hole expandability improvement rate being equal to or greater than 100% indicates that the hole expandability has improved compared with the unheated state.

As can be seen in FIG. 21, it is revealed that, when a steel sheet the principal microstructure of which is composed of a composite microstructure of ferrite and pearlite was used, improvement in the hole expansion ratio certainly increased at a heating temperature of 400° C. or more and the hole expansion ratio substantially fell when the specimen 30 was heated to 800° C. From the result described above, it is revealed that heating the steel sheet to a temperature within a temperature range of 400° C. or more and 700° C. or less causes stretch flange formability to be surely improved.

Although, in the present example, a case where the entire specimen 30 is heated and cooled is described, it has been confirmed that, even when only the edge (an area with a width of 1 mm from the edge face) of a hole opened in the specimen 30 was laser-heated and cooled by air cooling, setting the heating temperature at a temperature within a temperature range of 400° C. or more and 700° C. or less caused a hole expandability improvement rate to rise.

Example 22

Using a manufacturing method based on the treatment of the first embodiment for a steel sheet composed of the third composite microstructure, a steel sheet 10 that was sheared as illustrated in FIG. 8A was press-formed into a press component 11 having a target press component shape illustrated in FIG. 8B.

Note that, as for the steel sheet used, a high-strength steel sheet the sheet thickness t of which is 1.2 mm, the tensile strength of which is on the order of 780 MPa, and that is composed of a composite microstructure of ferrite and pearlite was used.

On this occasion, a crack estimation region RSK on the press component 11 was determined using CAE analysis based on conditions for press forming, as illustrated in FIG. 7, and an analysis region X on the steel sheet 10 corresponding to the crack estimation region RSK was determined, as illustrated in FIG. 8A. The analysis region X was heated to a predetermined heating temperature and cooled to a room temperature, and, subsequently, the steel sheet was subjected to cold pressing into the press component 11 having a component shape illustrated in FIG. 8B.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component when the heating temperature was 600° C., a crack was visually recognized in each of the cases of no heating, 350° C., and 800° C.

Example 23

Using a manufacturing method based on the treatment of the second embodiment for a steel sheet composed of the third composite microstructure, a steel sheet 10 that was sheared as illustrated in FIG. 10B was press-formed into a press component 11 having a target press component shape by way of an intermediate component 40, as illustrated in FIGS. 10C to 10E in sequence.

Note that, as for the steel sheet used, a high-strength steel sheet the sheet thickness t of which is 1.2 mm, the tensile strength of which is on the order of 780 MPa, and that is composed of a composite microstructure of ferrite and pearlite was used.

On this occasion, a crack estimation region RSK on the press component 11 was determined using CAE analysis based on conditions for press forming, as illustrated in FIG. 10A, and an analysis region X on the intermediate component 40 corresponding to the crack estimation region RSK was determined, as illustrated in FIG. 10D. The analysis region X was heated to a predetermined heating temperature and cooled to a room temperature and, subsequently, the intermediate component 40 was subjected to cold pressing into the press component 11 having a component shape illustrated in FIG. 10E.

The above heating was performed under, as a condition of a predetermined heating temperature, each of conditions of no heating, 350° C., 600° C., and 800° C., and occurrence or non-occurrence of a stretch flange crack on the target press component 11 was checked.

As a result, although there occurred no crack on an edge of the target press component 11 when the heating temperature was 600° C., a crack was visually recognized in each of the cases of no heating, 350° C., and 800° C.

Example 24

Using a manufacturing method based on the treatment of the third embodiment for a steel sheet composed of the third composite microstructure, a steel sheet that was sheared was formed into an intermediate component 40 in the first step, a portion of an edge 40a of the intermediate component 40 was subjected to shear treatment, and, subsequently, the intermediate component 40 after shear treatment was press-formed into a press component 11 having a target press component shape in the second step, as illustrated in FIGS. 12B to 12E in sequence.

Note that, as for the steel sheet used, a high-strength steel sheet the sheet thickness t of which is 1.2 mm, the tensile strength of which is on the order of 780 MPa, and that is composed of a composite microstructure of ferrite and pearlite was used.

On this occasion, a crack estimation region RSK on the press component 11 having the target shape was determined using CAE analysis based on conditions for press forming, as illustrated in FIG. 12A, and an analysis region X, illustrated in FIG. 12D, on the intermediate component 40 after shearing corresponding to the crack estimation region RSK was determined. The analysis region X on the intermediate component 40 was heated to a predetermined heating temperature and cooled to a room temperature, and, subsequently, the intermediate component 40 was subjected to cold pressing into the press component 11 having a component shape illustrated in FIG. 10E.

The above heating was performed at, as a predetermined heating temperature, each of no heating, 350° C., 600° C., and 800° C., and occurrence or non-occurrence of a stretch flange crack on the target press component shape was checked.

As a result, although there occurred no crack on an edge of the target press component when the heating temperature was 600° C., a crack was visually recognized in each of the cases of no heating, 350° C., and 800° C.

This application claims priority based on Japanese Patent Application No. 2019-034755, filed on Feb. 27, 2019, Japanese Patent Application No. 2019-034756, filed on Feb. 27, 2019, Japanese Patent Application No. 2019-034757, filed on Feb. 27, 2019, Japanese Patent Application No. 2019-118512, filed on Jun. 26, 2019, Japanese Patent Application No. 2019-118513, filed on Jun. 26, 2019, and Japanese Patent Application No. 2019-118514, filed on Jun. 26, 2019, the entire disclosures of which are incorporated herein by reference. Hereinbefore, the invention is described with reference to the limited number of embodiments, but the scope of the invention is not limited thereto, and modifications of the respective embodiments based on the above description will be obvious to those skilled in the art.

REFERENCE SIGNS LIST

1 Steel sheet manufacturing step
1A Shearing step
1B Heating and cooling step
1Ba Heat treatment
1Bb Cooling treatment
2 Pressing step
2A First step
2B Second step
3 Stretch-flange-crack region estimation processing (analysis step)
10 Steel sheet
11 Target press component
40 Intermediate component
50 Shearing step
51 Analysis step
52 Heating and cooling step

The invention claimed is:

1. A method for manufacturing a steel sheet, the method comprising:
a shearing step of subjecting at least a portion of an edge of the steel sheet to shearing;
an analysis step of determining, within the edge of the steel sheet subjected to shearing in the shearing step, a region where it is estimated that a stretch flange crack is likely to occur when the steel sheet is formed by cold pressing, wherein the region is specified through examination by computer-aided engineering (CAE) analysis using a computer based on conditions for the cold pressing, and
a heating and cooling step of heating, within the edge of the steel sheet, a site included in the region determined in the analysis step to a temperature within a heating temperature range preset according to a microstructural composition of the steel sheet and cooling the site, wherein
when the microstructural composition of the steel sheet is composed of a) 98 vol % or more of martensite, the heating temperature range is 500° C. or more and 700° C. or less; b) a composite microstructure of martensite and ferrite having: less than 95 vol % of martensite, less than 3 vol % of phases other than ferrite including residual austenite, and the rest being ferrite, the heating temperature range is 400° C. or more and 700° C. or less; c) 98 vol % or more of bainite, the heating temperature range is 400° C. or more and 700° C. or less; d) 98 vol % or more of ferrite, the heating temperature range is 400° C. or more and 700° C. or less; e) a composite microstructure of ferrite and pearlite wherein a sum of phase fractions of a ferrite phase and a pearlite phase is 98% or more and a phase fraction of the pearlite phase is 5% or more, the heating temperature range is 400° C. or more and 700° C. or less; and f) a composite microstructure having 3 vol % or more of residual austenite, the heating temperature range is 200° C. or more and 700° C. or less.

2. The method according to claim 1, wherein the edge that is heated in the heating and cooling step is set to an area up to 20 mm or less from an edge face of the steel sheet.

3. A method for manufacturing a press component, the method comprising:
manufacturing the steel sheet according to claim 1; and
subjecting the steel sheet to the cold pressing including stretch flange forming.

* * * * *